US006788887B2

(12) United States Patent
Takeshita et al.

(10) Patent No.: US 6,788,887 B2
(45) Date of Patent: Sep. 7, 2004

(54) CAMERA WITH INDICATOR FOR DETERMINING POSITION WITHIN THE ANGLE OF VIEW

(75) Inventors: Yukitaka Takeshita, Saitama (JP); Michio Cho, Saitama (JP); Kiyotaka Kobayashi, Saitama (JP); Hideo Kobayashi, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/245,497

(22) Filed: Sep. 18, 2002

(65) Prior Publication Data

US 2003/0053804 A1 Mar. 20, 2003

(30) Foreign Application Priority Data

Sep. 19, 2001 (JP) ........................................ 2001-284306
Apr. 26, 2002 (JP) ........................................ 2002-125693

(51) Int. Cl.⁷ .......................... G03B 17/02; G03B 17/18
(52) U.S. Cl. .............................. 396/6; 396/286; 396/376
(58) Field of Search ............................ 396/6, 286, 376

(56) References Cited

U.S. PATENT DOCUMENTS 4,685,787 A * 8/1987 Kinnard ....................... 396/32
5,408,287 A * 4/1995 Winegarden et al. ........ 396/502
6,408,133 B1 * 6/2002 Kawamura et al. ............ 396/6

FOREIGN PATENT DOCUMENTS

| JP | 53-17789 | 5/1978 |
| JP | 11-305293 | 11/1999 |
| JP | 2000-147631 | 5/2000 |
| JP | 2000-305134 | 11/2000 |

* cited by examiner

Primary Examiner—Rodney Fuller
Assistant Examiner—Arthur A Smith
(74) Attorney, Agent, or Firm—Sughrue Mion, PLLC

(57) ABSTRACT

The present invention provides a camera comprising such a function for self-photographing that a self-photographer cannot only determine whether or not he or she is within the angle of view but can also determine his or her position within the angle of view more accurately than in the prior art. The present invention provides a camera that photographs a subject present within a photographing angle of view, according to a photographing operation, the camera comprising an indicator, and an optical path regulating member that allows, during self-photographing, a photographer to view the indicator with information on the photographer's own position within the photographing angle of view.

40 Claims, 31 Drawing Sheets

CAMERA WITH INDICATOR FOR DETERMINING POSITION WITHIN THE ANGLE OF VIEW

BACKGROUND OF THE INVENTION

1. Field of the Invention

The present invention relates to a camera comprising a function for self-photographing.

2. Description of the Related Art

So-called self-photographing is conventionally carried out wherein a photographer directs a photographing lens of a camera to himself or herself and operates a shutter to take a photograph.

For example, Japanese Patent Laid-Open No. 2000-147631 proposes a camera comprising a visual check section provided inside it or on its rear surface and used as a guide when the photographer determines whether or not he or she is within the angle of view, and a viewing window formed in a front surface of the camera and through which the photographer views the visual check section from the front of the camera. With this camera, if the photographer can view the visual check section through the viewing window, formed in the front surface of the camera, the photographer can determine that he or she is within the angle of view. If the photographer cannot view the visual check section, the photographer can determine that he or she is out of the angle of view.

However, this camera enables the photographer to determine during self-photographing whether or not he or she is within the angle of view, but does not enable the photographer to easily determine where he or she is photographed within the angle of view. Accordingly, it is disadvantageously difficult to take a photograph in which the photographer is located at the desired position within the angle of view.

SUMMARY OF THE INVENTION

In view of these circumstances, it is an object of the present invention to provide a camera comprising such a function for self-photographing that a self-photographer cannot only determine whether or not he or she is within the angle of view but can also determine his or her position within the angle of view more accurately than in the prior art.

To attain the above object, the present invention provides a first camera that photographs a subject present within a photographing angle of view, according to a photographing operation, the camera comprising:

an indicator; and an optical path regulating member that allows, during self-photographing, a photographer to view the indicator with information on the photographer's own position within the photographing angle of view.

With the first camera of the present invention, the self-photographer within the angle of view can view the indicator via a part of the optical path regulating member which varies with his or her position within the angle of view. Thus, according to the camera of the present invention, the self-photographer can determine his or her position within the angle of view more accurately than in the prior art on the basis of the part of the optical path regulating member, via which he or she views the indicator.

In the first camera of the present invention, the optical path regulating member preferably has a plurality of viewing windows that allow, during self-photographing, the photographer to view the indicator only when the photographer views the indicator from a plurality of predetermined directions within the photographing angle of view.

This prevents the resulting photograph from being limited to a uniform composition.

Further, preferably, the first camera of the present invention comprises a plurality of the indicators, and the optical path regulating member has a viewing window that allows, during self-photographing, the photographer to view one of the plurality of indicators when the photographer views the indicator from one of a plurality of predetermined directions within the photographing angle of view.

This also prevents the resulting photograph from being limited to a uniform composition.

Further, according to a preferred aspect of the first camera of the present invention, the optical path regulating member has three viewing windows that allow, during self-photographing, the photographer to view the indicator only when the window is viewed from either a central direction or a predetermined right-hand direction or a predetermined left-hand direction within the photographing angle of view.

This enables the photographer to be set accurately in the center, left, or right of the angle of view during photographing.

Furthermore, a preferred aspect of the first camera of the present invention comprises shutter buttons for a photographing operation arranged at respective opposite ends of a top surface of the camera.

This conveniently allows the photographer to carry out self-photographing with the right hand.

Preferably, in the first camera of the present invention, the viewing window is sized to allow the photographer to view the indicator with both eyes when the photographer views the indicator from one of the plurality of predetermined directions.

This eliminates a difference between a predetermined position within the angle of view set by a right-eyed photographer and the same position set by a left-eyed photographer. Further, the indicator can be viewed with both eyes and is thus seen more easily.

Further, preferably, in the first camera of the present invention, the viewing window comprises refraction member that refracts beams traveling from the indicator toward the viewing window, toward an optical axis of a photographing lens.

With this arrangement, compared to the prior art, in which the viewing window is formed closer to the optical axis of the camera relative to the indicator to cause light traveling from the indicator toward the viewing window to cross the optical axis in order to adjust the position within the angle of view at which the photographer is photographed, the light traveling from the indicator toward the viewing window can cross the optical axis without the need to form the viewing window closer to the optical axis of the camera relative to the indicator. Consequently, the size of the camera can be reduced.

Furthermore, preferably, the refraction member is also used as a cover member that covers the viewing window.

In this manner, the refraction member may be molded integrally with the cover member of the camera as a part thereof.

Alternatively, in a preferred aspect, the refraction member is shaped like a wedge.

In this manner, the refraction member may be shaped like a wedge.

In this case, preferably, in the first camera of the present invention, the viewing window is disposed adjacent to a photographing lens barrel.

This enables the effective use of a dead space present adjacent to the lens barrel. Consequently, compared to the case where the camera contains a space for only the indicator and viewing window, the size of the camera can be reduced.

To attain the above object, the present invention provides a second camera that photographs a subject present within a photographing angle of view, according to a photographing operation, the camera comprising:

a reflecting mirror that allows a photographer to determine that the object is within the photographing angle of view during self-photographing, the reflecting mirror being able to be set to face in any of a plurality of directions and to remain facing in this direction.

In the second camera of the present invention, the above configuration enables the reflecting mirror to be held in such a predetermined direction that during self-photographing, the photographer can look in the reflecting mirror to determine whether or not he or she is within the photographing angle of view depending on whether he or she is reflected in the reflecting mirror. Accordingly, also with the second camera of the present invention, the self-photographer can determine his or her position within the photographing angle of view more accurately than in the prior art by viewing the reflecting mirror.

In a preferred aspect, the first camera of the present invention comprises a reflecting mirror that allows the photographer to determine that the object is within the photographing angle of view during self-photographing, the reflecting mirror being able to be set, during self-photographing, to face in a direction in which the photographer can determine that the photographer is within the photographing angle of view irrespective of whichever of the plurality of directions the photographer views the indicator from.

Moreover, in a preferred aspect, the camera comprises color changing means for changing only one of the different colors of the indicator perceived when the photographer views the indicator from each of the plurality of predetermined directions, the color corresponding to the direction of the reflecting mirror.

With this arrangement, if a plurality of people join self-photographing, it can be determined in which of the plurality of predetermined directions the angle of view for actual photographing is reflected on the reflecting mirror.

Further, preferably, in the first camera of the present invention, the indicator is a light emitting element comprising an alarm display section that guides light from the light emitting element to notify the photographer of a self-photographing mode.

This prevents such a mistake that the photographer carries out normal photographing under self-photographing conditions including focus lock and flash extinction for a near position.

In this case, preferably, in the first camera of the present invention, the indicator is a light emitting element which is lighted in response to switching to the self-photographing mode, starts blinking after a predetermined time, and is subsequently put out.

This not only reduces power consumption attributed to light emission from the light emitting element but also prevents the self-photographer from being surprised to see the light emitting element as the indicator being put out, though he or she has selected the self-photographing mode.

DETAILED DESCRIPTION OF THE PREFERRED EMBODIMENTS

Embodiments of the present invention will be described below.

First, a first embodiment of a camera of the present invention will be described.

Figure 1:
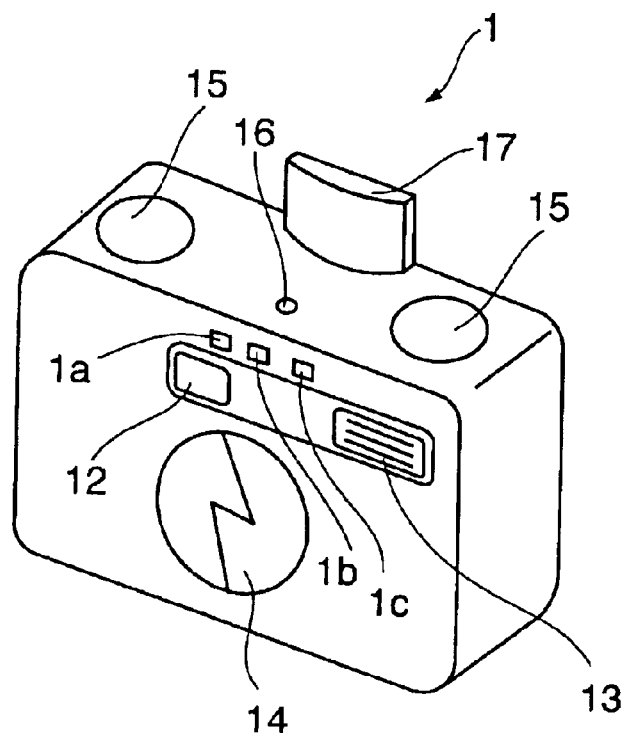
FIG. 1 is a perspective view of the appearance an embodiment as viewed diagonally from the front thereof.

FIG. 1 is a perspective view of the appearance of this embodiment as viewed diagonally from the front.

A camera 1 according to this embodiment, shown in FIG. 1, is a compact camera having a self-photographing mode and containing a lens barrel. When a self-photographing mode is selected, an LED 19 (see FIG. 3) inside the camera is lighted. On a front surface of the camera 1 are provided a lens barrier 14 located near the center thereof so as to cover a photographing lens, a finder objective window 12 located at the upper right (the left in FIG. 1) of the lens barrier, a flash light emitting window 13 located at the upper left of the lens barrier, and three viewing windows 1a, 1b, and 1c located above the finder objective window 12 and used for self-photographing. The LED 19 is provided inside the camera in the upper part thereof as a target viewed through the three viewing windows 1a, 1b, and 1c.

On a top surface of the camera 1 are provided release buttons 15 located at the opposite ends thereof, a light guide 16 that guides light out of the camera which is emitted by the LED 19, lighted inside the camera when the self-photographing mode is selected, and a reflecting mirror 17 located closer to a rear surface of the camera and described later in detail.

With this camera 1, if for example, a self-photographer positions himself or herself in the center of the photographing angle of view, the self-photographer may move to a position at which he or she can observe light from the LED 19 through the central viewing window 1b, one of the three viewing windows 1a, 1b, and 1c, located in front of the LED 19. If the self-photographer positions himself or herself in the right of the photographing angle of view, the self-photographer may move to a position at which he or she can observe light from the LED 19 through the right-hand viewing window 1a. On the other hand, if the self-photographer positions himself or herself in the left of the photographing angle of view, the self-photographer may move to a position at which he or she can observe light from the LED 19 through the left-hand viewing window 1c.

Further, with the camera 1, if the self-photographer observes light from the LED through the viewing window 1b in order to position himself or herself in the center of the angle of view, the self-photographer may manually direct the reflecting mirror 17, provided so as to stand from the top surface of the camera, so that it faces a predetermined position at the front of the camera. If the self-photographer observes light from the LED through the viewing window 1a in order to position himself or herself in the right of the angle of view, the self-photographer may manually direct the reflecting mirror 17 so that it faces a predetermined position located slightly rightward from the above position (slightly toward the left side when facing the camera). If the self-photographer observes light from the LED through the viewing window 1c in order to position himself or herself in the left of the angle of view, the self-photographer may manually direct the reflecting mirror 17 so that it faces a predetermined position located slightly leftward from the above position (slightly toward the right side when facing the camera). Thus the subject can be reflected on the reflecting mirror.

Figure 2:
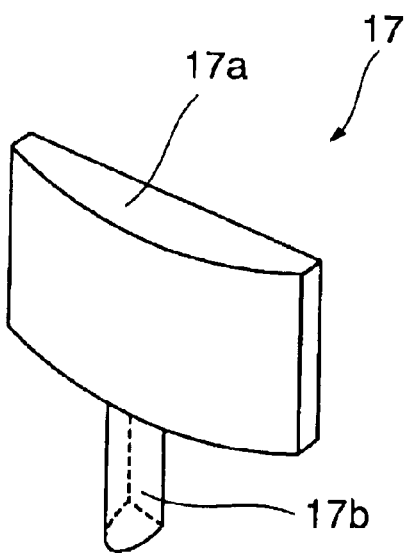
FIG. 2 is a perspective view of the appearance of a reflecting mirror provided on a top surface of the camera shown in FIG. 1 so as to stand therefrom.

FIG. 2 is a perspective view of the appearance of the reflecting mirror, provided so as to stand from the top surface of the camera, shown in FIG. 1.

The reflecting mirror 17, shown in FIG. 2, is composed of an upper mirror section 17a and a lower insertion bar 17b. The lower insertion bar 17b has a cross section shaped like an ellipse cut into halves.

Further, the reflecting mirror 17, shown in FIG. 2, is freely removable from the camera 1. Before self-photographing, the insertion bar 17b of the reflecting mirror 17 is inserted into an insertion port 18 (see FIGS. 3 and 4) formed in the top surface of the camera 1.

Figure 3:
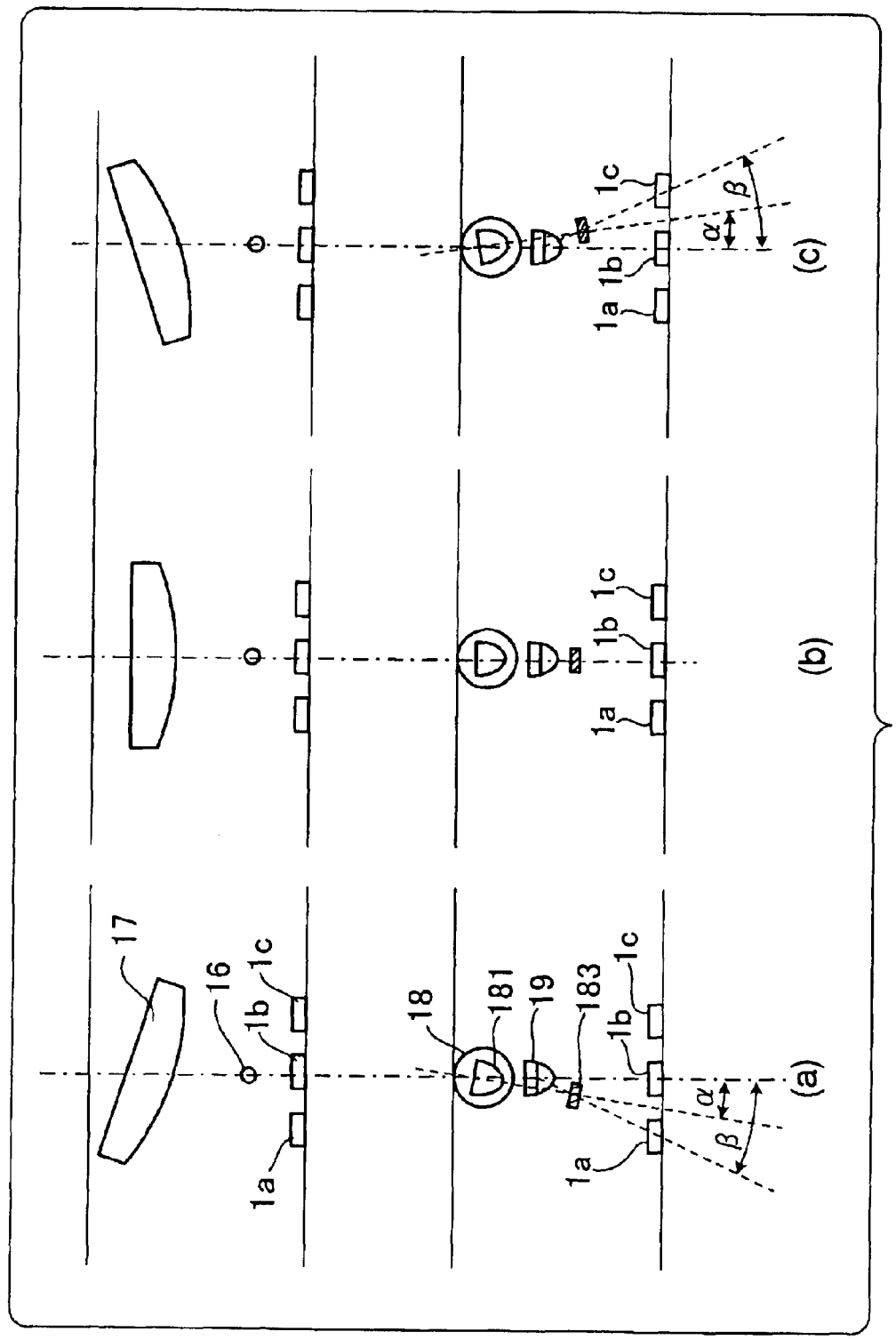
FIG. 3 is a view showing three manners in which the reflecting mirror is used during self-photographing.

FIG. 3 shows three manners in which the reflecting mirror is used during self-photographing.

The upper portions of parts (a) to (c) in FIG. 3 show the direction of the reflecting mirror set when the photographer is positioned in the right, center, and left of the photographing angle of view, respectively. These parts also show the light guide 16 and the viewing windows 1a, 1b, and 1c.

The lower portions of parts (a) to (c) in FIG. 3 show the insertion port 18, into which the insertion bar 17b of the reflecting mirror 17 is inserted and which is provided on the upper surface of the camera 1; a cylindrical portion 181 of an embedded member 180 (see FIG. 4) molded of ABS resin so as to form the insertion port 18; the LED 19; and a colored filter 183 attached to the cylindrical portion 181 via an arm 182. The angle of the reflecting mirror with respect to the optical axis of the camera is determined so as to correspond to the cases in which the LED 19 is viewed through each of the three viewing windows 1a, 1b, and 1c. In this case, the angle (horizontal component) between the optical axis of the camera and the central axis of the reflecting mirror 17 is defined as a. The angle (horizontal component) between the optical axis and a predetermined right-hand or left-hand direction (a line joining the center of the viewing window 1a or 1c with the LED 19) within the photographing angle of view is defined as β. The angle α is set to be half of the angle β.

Figure 4:
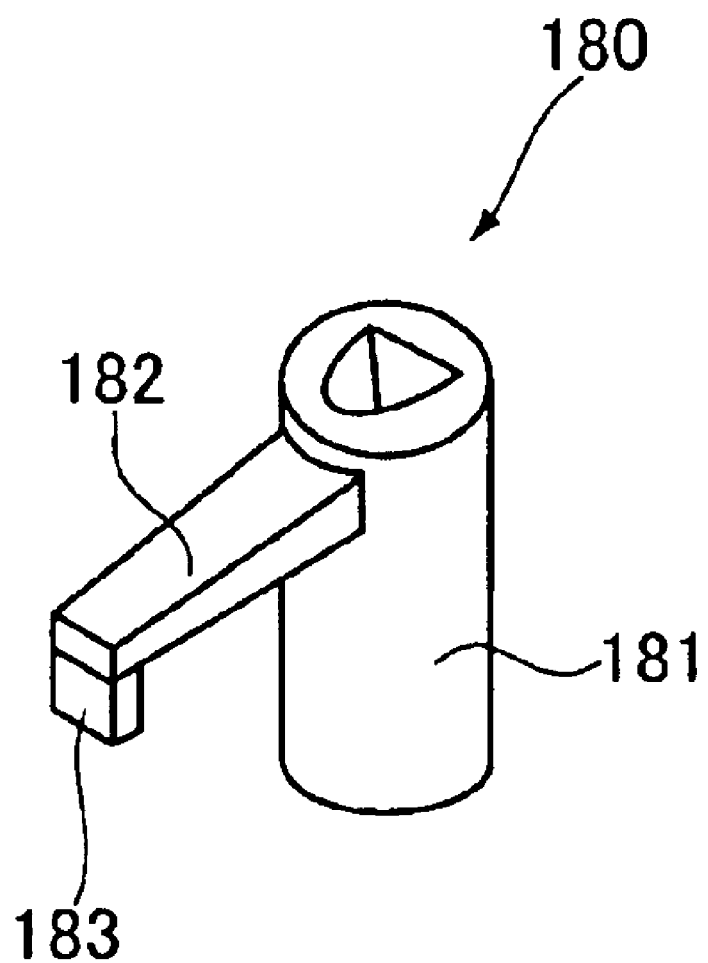
FIG. 4 is a perspective view of the appearance of an embedded member.

FIG. 4 is a perspective view of the appearance of the embedded member.

FIG. 4 shows the cylindrical portion 181, the arm 182, welded to the cylindrical portion, and the colored filter 183, attached to the arm, all of which are components of the embedded member 180, constituting the insertion port 18.

The cylindrical portion 180 and the colored filter 183, shown in the lower portion of parts (a) to (c) in FIG. 3, are joined together via the arm 182. Thus, when the reflecting mirror 17 is set in one of the three predetermined positions, the colored filter 183 is located at one of the three positions corresponding to the three viewing windows 1a, 1b, and 1c. That is, when the reflecting mirror 17 is located slightly leftward from the self-photographer as shown in part (a) of FIG. 3, only light from the LED which can be observed through the right (left in part (a) of FIG. 3) viewing window 1a is transmitted through the colored filter 183. At this time, the photographer can view, through the viewing windows 1b and 1c, light from the LED itself which is not transmitted through the colored filter. Accordingly, with the camera 1, light from the LED which can be observed through the viewing window corresponding to the predetermined direction in which the reflecting mirror 17 faces has a color different from that of light from the LED which can be observed through the two other viewing windows corresponding to the predetermined directions in which the reflecting mirror does not face. A photographing range coincides with the range of view reflected in the reflecting mirror and which is viewed by a person to whom the light appears to have a color different from that of the light in the other directions. In part (b) of FIG. 3, light from the LED which can be observed through the viewing window 1b appears to have a color different from that of the light in the other directions. In part (c) of FIG. 3, light from the LED which can be observed through the viewing window 1c appears to have a color different from that of the light in the other directions. With this arrangement, if a plurality people join self-photographing and the LED is viewed through the three viewing windows 1a, 1b, and 1c, the actual angle of view for photographing matches an image reflected in the reflecting mirror, which faces in a predetermined direction in which light appears to have a color different from that of light emitted by the LED 19 itself. This enables self-photographing to be achieved while checking the actual angle of view for photographing.

Then, detailed description will be given of light from the LED which can be observed through the viewing window and the reflecting mirror that is manually moved so as to correspond to the viewing window used.

Figure 5:
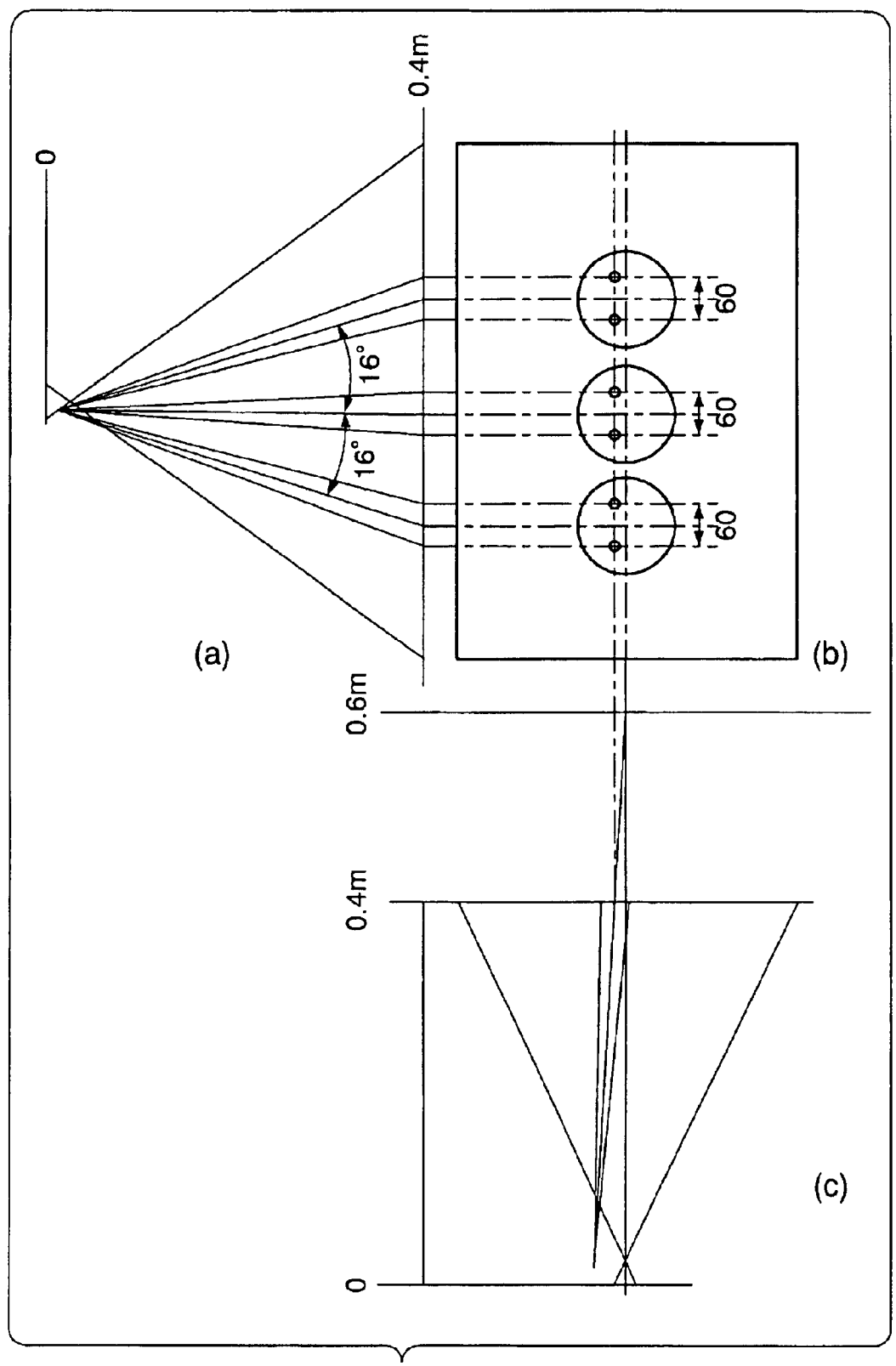
FIG. 5 is a conceptual drawing showing how three people located in front of a film surface in the camera and within a photographing angle of view as subjects observe, with both eyes, light from an LED through the respective three viewing windows.

FIG. 5 is a conceptual drawing showing how three people located in front of a film surface in the camera and within the photographing angle of view as subjects observe, with both eyes, light from the LED through the respective three viewing windows.

Part (a) of FIG. 5 shows how light from the LED travels within the angle of view while being regulated by the three viewing windows.

In part (b) of FIG. 5, three circles represent three people as subjects. Two smaller circles shown in each of the three circles represent the corresponding person's both eyes. Further, the interval between both eyes of the subject is set at 60 mm. This figure shows how the subjects observe, with both eyes, light from the LED through the three three viewing windows. The camera 1 uses a photograph film with 24×36 mm frames. During self-photographing, focal distance is fixed at 24 mm, so that the angle of view is 72°.

Further, in the camera 1, to maintain balance between the three people relative to the angle of view of 72°, light from the LED passing through the point located midway of the viewing windows adjacent to each other is set to travel within the angle of view while maintaining an angle of 16° in the horizontal direction. Furthermore, to allow people located 400 mm before the film surface and whose interval between both eyes is up to 60 mm to observe light from the LED with both eyes, the sizes of the viewing windows are regulated so that beams passing through the respective three viewing windows travel within the angle of view at an angle of 9° in the horizontal direction.

Part (c) of FIG. 5 shows how vertical components of light from the LED 19 travel within the angle of view while being regulated by the viewing windows. Light from the LED, regulated by the viewing windows, crosses a horizontal plane containing the optical axis of the camera 1 after traveling 600 mm forward from the film surface.

Figure 6:
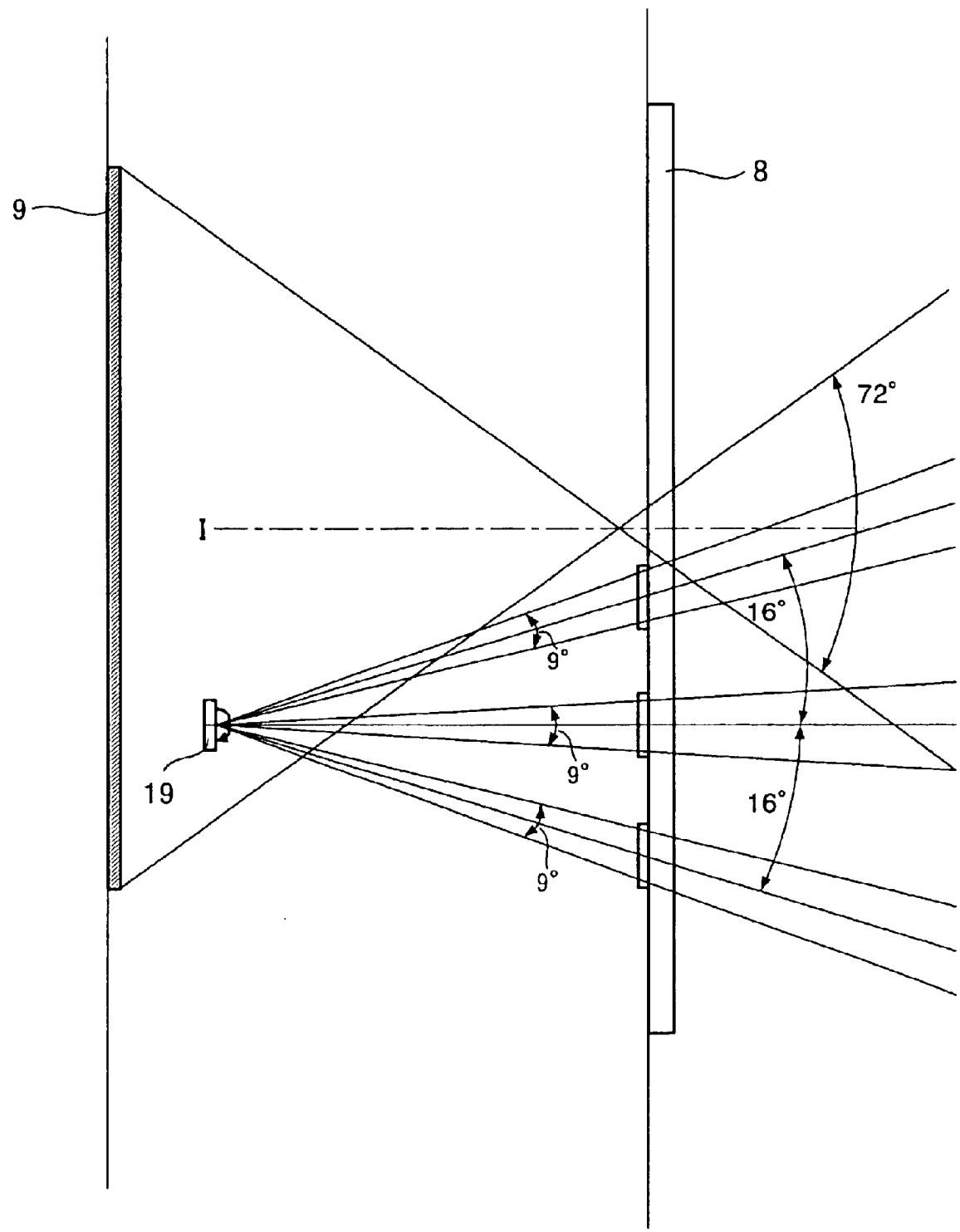
FIG. 6 shows horizontal components of light from the LED, which travel within the angle of view while being regulated by the three viewing windows.

FIG. 6 shows horizontal components of light from the LED, which travel within the angle of view while being regulated by the three viewing windows.

FIG. 6 shows a transverse sectional view of the camera 1. This figure shows not only one frame of a roll-like photographic film 9 located at the rear surface of the camera 1; the LED 19; the three viewing windows 1a, 1b, and 1c; a lens barrel 8; and the optical axis I of the camera but also beams from the LED having a horizontal angle of 9° and regulated by the viewing windows so that beams from the LED passing through the point located midway of the viewing windows adjacent to each other form an angle of 16° and so that people located 400 mm before the film surface and whose interval between both eyes is up to 60 mm can observe the beams with both eyes. In connection with the horizontal angle of 9°, if it is assumed that the interval between both eyes of a person as a subject of self-photographing is between 50 and 70 mm and that for near photographing in the self-photographing mode, the distance from the film surface is between 300 and 500 mm, light from the LED can be observed with both eyes by regulating the size of the viewing windows so that the angle is at least 6°. It is further ensured that light from the LED can be observed with both eyes, by regulating the size of the viewing windows so that the angle is at least 13°.

Figure 7:
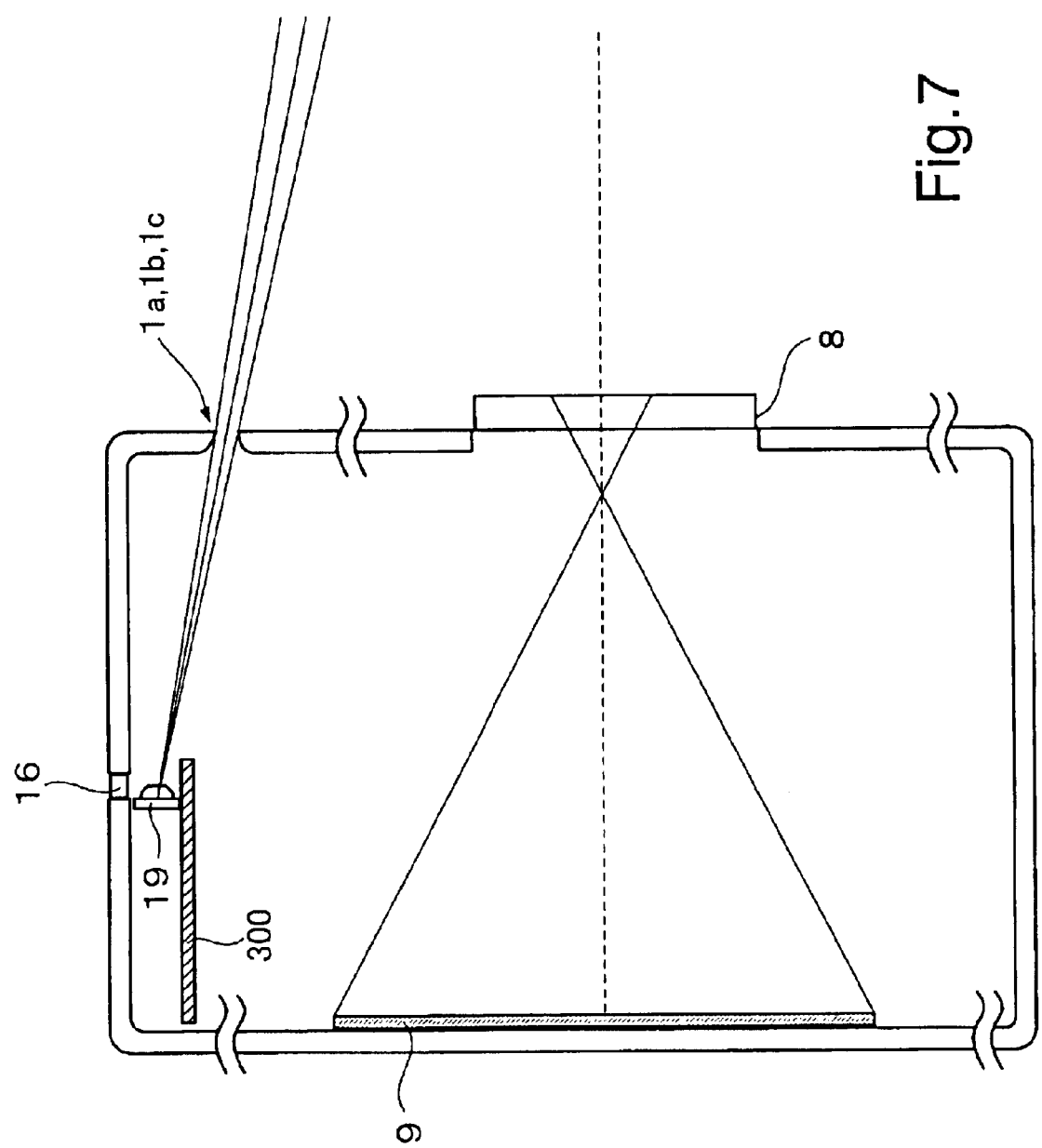
FIG. 7 shows vertical components of light from the LED, which travel within the angle of view while being regulated by the three viewing windows.

FIG. 7 shows vertical components of light from the LED, which travel within the angle of view while being regulated by the three viewing windows.

FIG. 7 shows a transverse sectional view of the camera 1. This figure shows not only the light guide 16, used to check whether the current photographing mode is 'self-photographing', the LED 19, and an electric substrate 300 to which the LED 19 is connected but also the viewing windows 1a, 1b, and 1c, the optical axis I, the photographic film 9, and the lens barrel 8. In the camera 1, the viewing windows are formed closer to the optical axis relative to the LED 19 in order to set a subject photographed within the photographing angle of view at the optimum position for print photographing in the height direction. Thus, light from the LED 19 is regulated by the viewing windows so as to cross the optical axis of the camera in an area located somewhat away from the film surface and in which self-photographing may be carried out.

Figure 8:
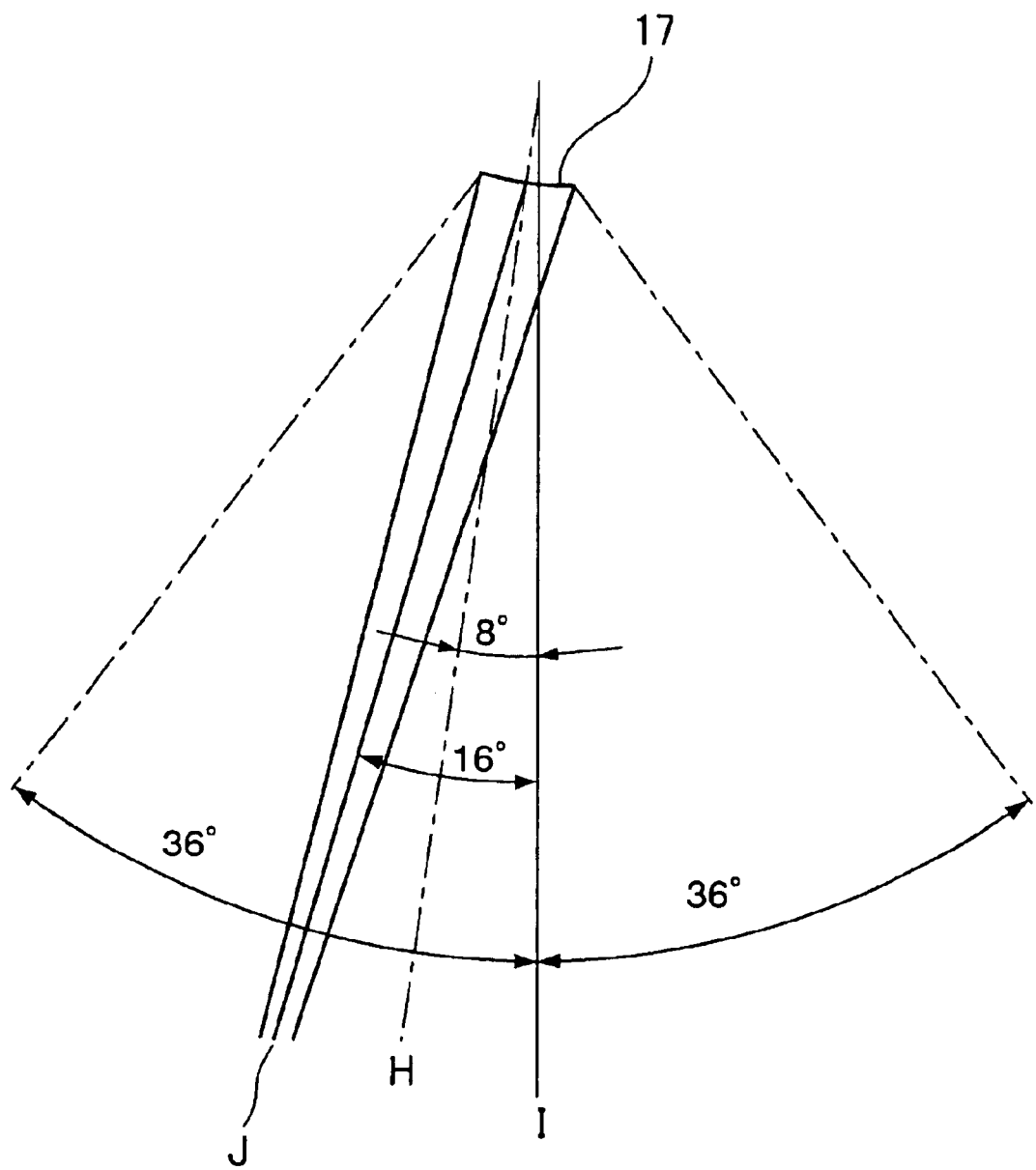
FIG. 8 is a view illustrating the angle of the reflecting mirror.

FIG. 8 illustrates the angle of the reflecting mirror.

FIG. 8 shows the reflecting mirror directed slightly rightward relative to the self-photographer, and also shows an angle of view of 72°, the optical axis I of the camera, a normal H of the reflecting mirror, and a line J joining the LED 19 with the center of the right viewing window 1a. When the angle between the optical axis I of the camera and the line J is 16°, if the angle between the optical axis I of the camera and the normal H of the reflecting mirror is 8°, half of 16°, then the photographing range corresponds to an image viewed on the reflecting mirror while observing light from the LED 19 through the right viewing window 1a.

In the camera 1 of this embodiment, as described previously, when the self-photographing mode is selected, the LED 19 is lighted. This is carried out by a routine activated simultaneously with the selection of the self-photographing mode.

Figure 9:
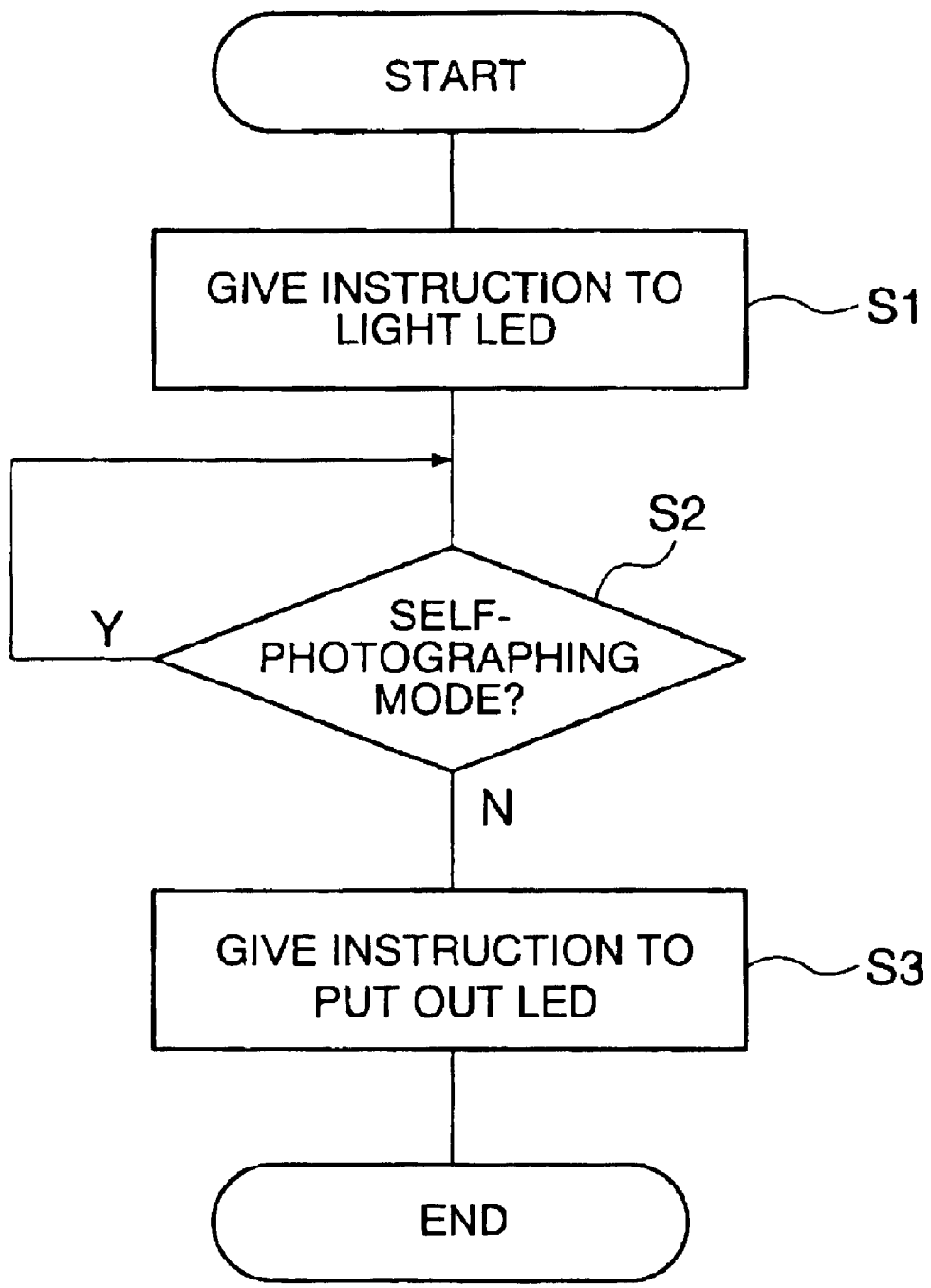
FIG. 9 is a flow chart of a routine 'self-photographing' activated when a self-photographing mode is selected.

FIG. 9 is a flow chart of the routine 'self-photographing', activated when the self-photographing mode is selected.

First, at step S1, the routine shown in FIG. 9 instructs camera to light the LED 19. Subsequently, the routine proceeds to step S2 to determine whether the self-photographing mode has been selected.

If it is determined at step S2 that the current mode is self-photographing mode, step S2 is repeated.

If it is determined at step S2 that the current mode is not self-photographing, the routine proceeds to step S3 to give an instruction to put out the LED 19. Subsequently, the routine is ended. Thus, with the camera 1, when the self-photographing mode is selected, the LED 19 is lighted and light from the LED is guided out of the camera through the light guide 16. This prevents the photographer from carrying out normal photographing by mistake while forgetting selecting the self-photographing mode, in which focus lock and the like are executed. In the camera 1 of this embodiment, the LED 19 is used as both an indicator for determining a predetermined position within the photographing angle of view and an indicator indicating that the current mode is self-photographing mode. Consequently, costs are reduced compared to provision of separate indicators. Further, in the camera 1 of this embodiment, light emitted by the LED 19 is guided to the top surface of the camera through the light guide 16. However, light may be viewed around a finder ocular window or in a finder.

Figure 10:
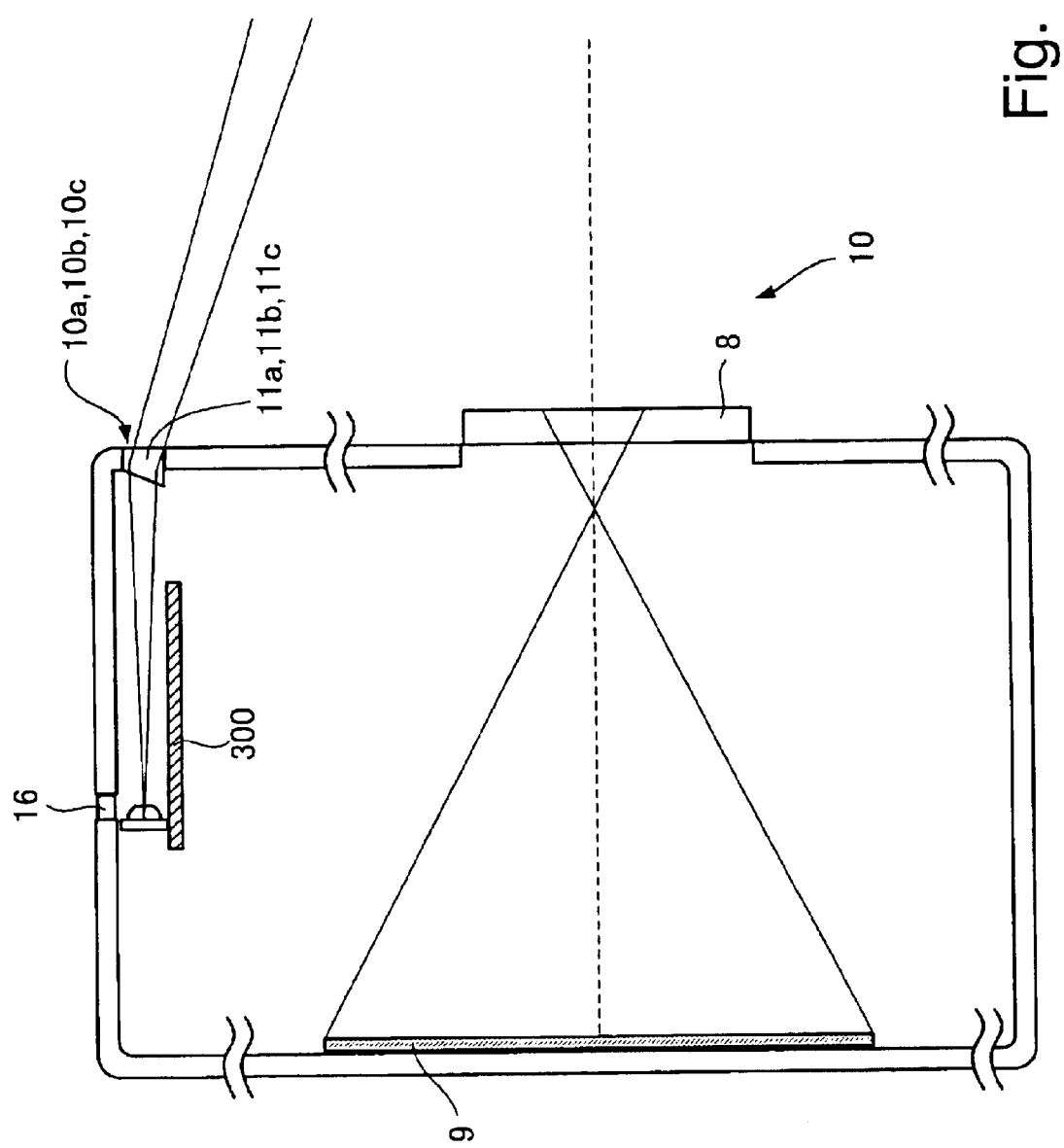
FIG. 10 is a vertical sectional view of a camera having viewing windows formed closer to the top surface of the camera than the viewing windows shown in FIG. 7.

FIG. 10 is a vertical sectional view of a camera having viewing windows formed closer to the top surface of the camera than the viewing windows shown in FIG. 7. Those components shown in FIG. 10 which are of the same type as the corresponding components shown in FIG. 7 are denoted by the same reference numerals as those in FIG. 7.

A camera 10 according to another aspect of this embodiment, shown in FIG. 10, has viewing windows 10a, 10b, and 10c formed at substantially the same height as the LED 19. Furthermore, the viewing windows have wedge-shaped refraction members 11a, 11b, and 11c embedded therein to direct light from the LED passing through the viewing windows, toward the optical axis. Thus, the distance from the LED to the optical axis of the camera is larger than the distance from the viewing window to the optical axis of the camera. Consequently, compared to the prior art, in which light from the LED passing through the viewing windows is directed toward the optical axis, the size of a dead space in front of the LED 19 can be reduced. In FIG. 7, which is a vertical sectional view of the conventional camera, the electric substrate 300 is provided in the rear of the camera main body so as not to interrupt beams from the LED 19. However, in FIG. 10, the electric substrate 300, which must be provided in the rear of the camera main body in FIG. 7, can be provided at front of the LED 19. Thus, the camera 10 according to another aspect of this embodiment enables the dimension of the camera main body to be reduced in the height direction. Further, a space behind the LED 19 occupied by the electric substrate 300 in FIG. 7 is also freely available, thereby enabling the size of the camera to be reduced.

The wedge shapes of these refraction members 11a, 11b, and 11c enables the same effects as those produced with rectangular parallelepiped or cubic refraction members to be produced with lower costs.

Figure 11:
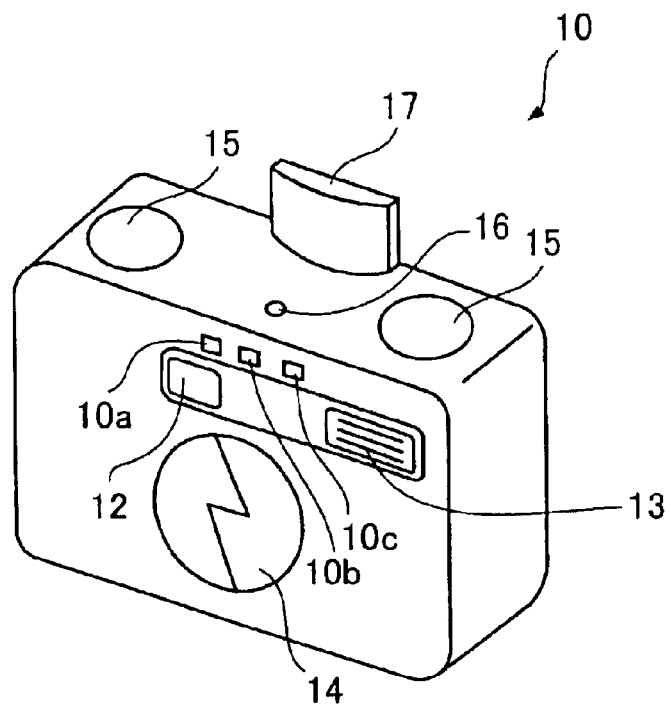
FIG. 11 is a perspective view of the appearance of the camera according to the another aspect of this embodiment described in FIG. 10, as viewed diagonally from the front of the camera.

FIG. 11 is a perspective view of the appearance of the camera according to another aspect of this embodiment described in FIG. 10, as viewed diagonally from the front of the camera.

In the camera 10 according to another aspect of this embodiment shown in FIG. 11, the viewing windows 10a, 10b, and 10c are formed closer to the top surface of the camera than the viewing windows 1a, 1b and 1c shown in FIG. 1, as described in FIG. 10.

Figure 12:
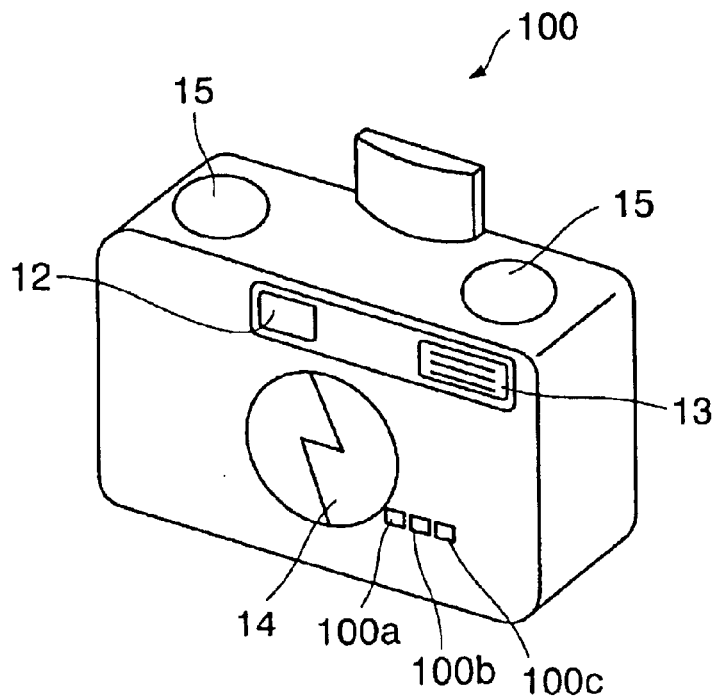
FIG. 12 is a view showing an aspect in which the viewing windows and LED provided near the center of top of the camera in FIGS. 1 and 11 are installed near the lower left of a lens barrel.

FIG. 12 shows an aspect in which the viewing windows and LED provided near the center of top of the camera in FIGS. 1 and 11 are installed near the lower left of the lens barrel.

In a camera 100 according to another aspect of this embodiment shown in FIG. 12, viewing windows 100a, 100b, and 100c and the LED 19 are installed near the lower left of the lens barrel. In this case, a space located at the lower left of the lens barrel 8 is utilized. If an available space is located at the upper left, upper right, or lower right of the lens barrel instead of the lower left thereof, this space may be utilized. This enables the size of the camera to be further reduced in the height direction compared to the camera 10 shown in FIG. 11.

Figure 13:
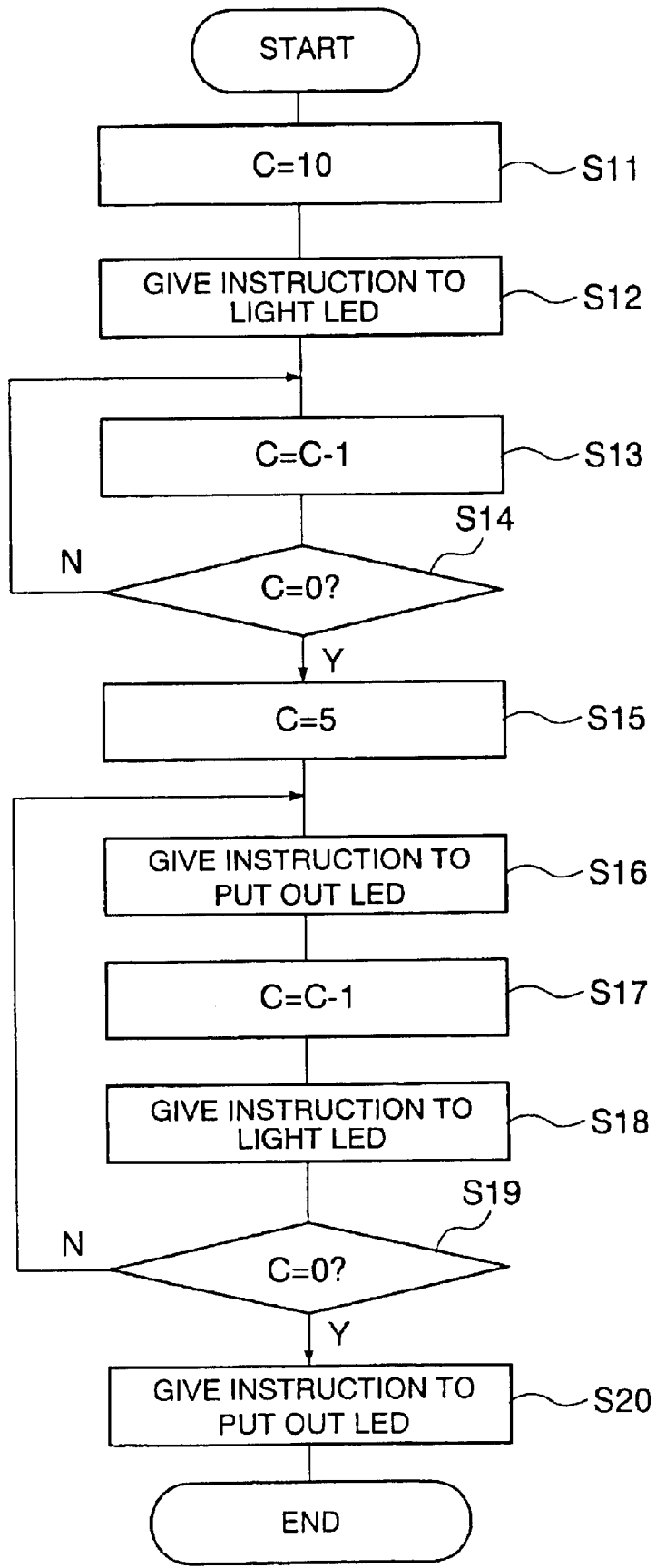
FIG. 13 is a flow chart of a routine according to another aspect of this embodiment which is activated if the self-photographing mode is selected in the camera of this embodiment.

FIG. 13 is a flow chart of a routine activated if the self-photographing mode is selected in the camera according to the another aspect of this embodiment. In this aspect, once this routine is completed, the self-photographing mode switches back to the normal photographing mode.

In the routine 'self-photographing' shown in FIG. 13, at step S11, C is provided with a value of 10. Subsequently, at step S12, an instruction is given to light the LED. Then, at step S13, 1 is subtracted from C. Subsequently, the routine proceeds to step S14.

At step S14, it is determined whether or not the value of C becomes zero as a result of the subtraction. If it is determined in step S14 that C has not become zero yet, the routine returns to step S13 to repeat the subtraction from C.

At step S14, if it is determined that C has become zero, the routine proceeds to step S15 to provide C with a value of 5. Subsequently, the routine proceeds to step S16 to give an instruction to put out the LED, which has been lighted as a result of the instruction given at step S12. Then, at step S17, a value of 1 is subtracted from C. Subsequently, at step S18, an instruction is given to light the LED. Then, at step S19, it is determined whether or not the value C becomes zero as a result of the subtraction.

At step S19, if it is determined that the value of C is not zero, the routine returns to step S16. If it is determined that the value of C is zero, the routine proceeds to step S20 to instruct to put out the LED. Subsequently, the routine is ended.

As described above, when the self-photographing mode is selected, the LED 19 is lighted to notify the photographer that the self-photographing mode has been selected, and the LED 19 is subsequently blinked and then put out in order to reduce power consumption. This enables the photographer to determine that the self-photographing mode is to be ended without being surprised, while reducing power consumption.

In the example of the first embodiment, described above, three viewing windows are formed. However, the present invention is not limited to this aspect, but a configuration is possible in which light from the LED can be observed at a total of five predetermined positions within the angle of view including a front position, two right-hand positions, and two left-hand positions and in which the reflecting mirror 17 can be directed to predetermined positions corresponding to these five predetermined positions.

Now, a second embodiment of the present invention will be described.

Figure 14:
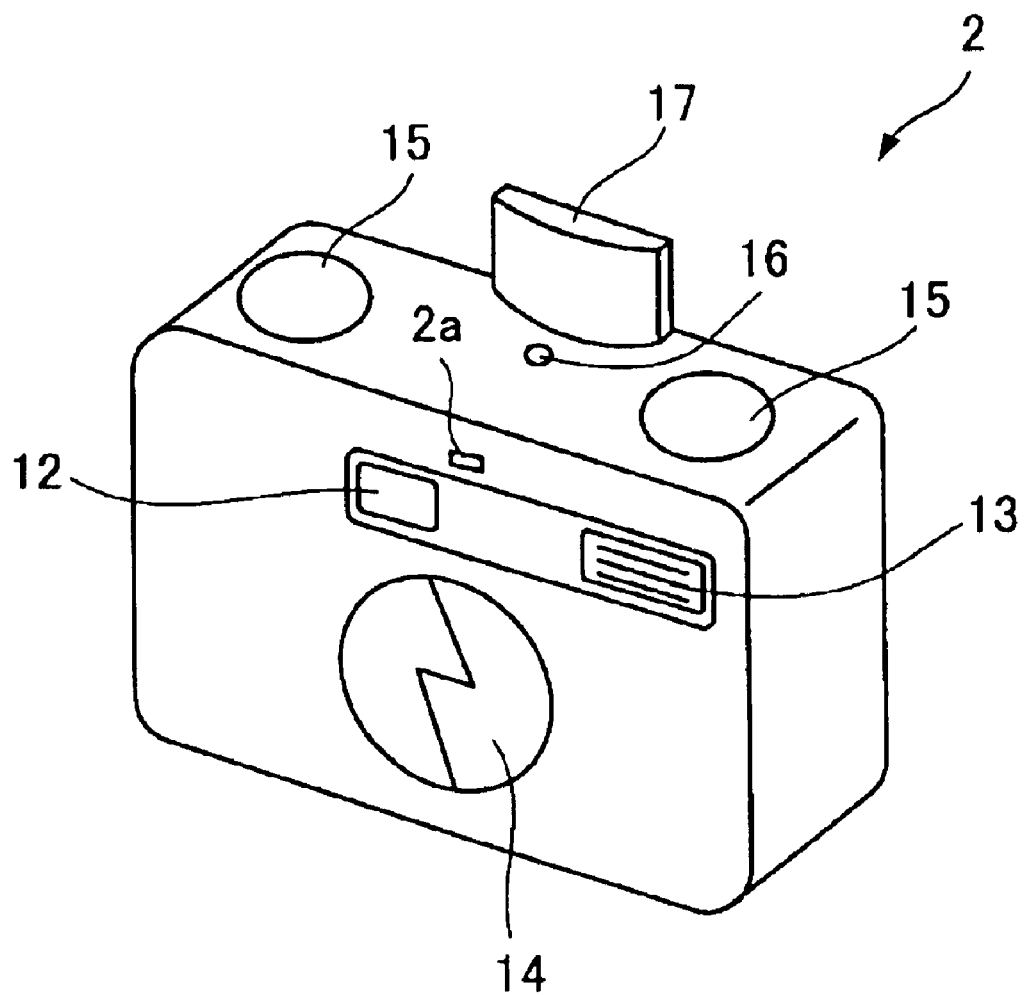
FIG. 14 is a perspective view of the appearance of this embodiment as viewed diagonally from the front thereof.

FIG. 14 is a perspective view of the appearance of this embodiment as viewed diagonally from the front thereof. Those components shown in FIG. 14 which are of the same type as the corresponding components shown in FIG. 1 are denoted by the same reference numerals as those in FIG. 1.

A camera 2 of this embodiment, shown in FIG. 14 is a compact camera of the same type as the camera 1 of the first embodiment, shown in FIG. 1, which contains a lens barrel.

In connection with appearance, the camera 2, shown in FIG. 14, differs from the camera 1, shown in FIG. 1, in that only one viewing window is formed compared to the three viewing windows in FIG. 1.

Figure 15:
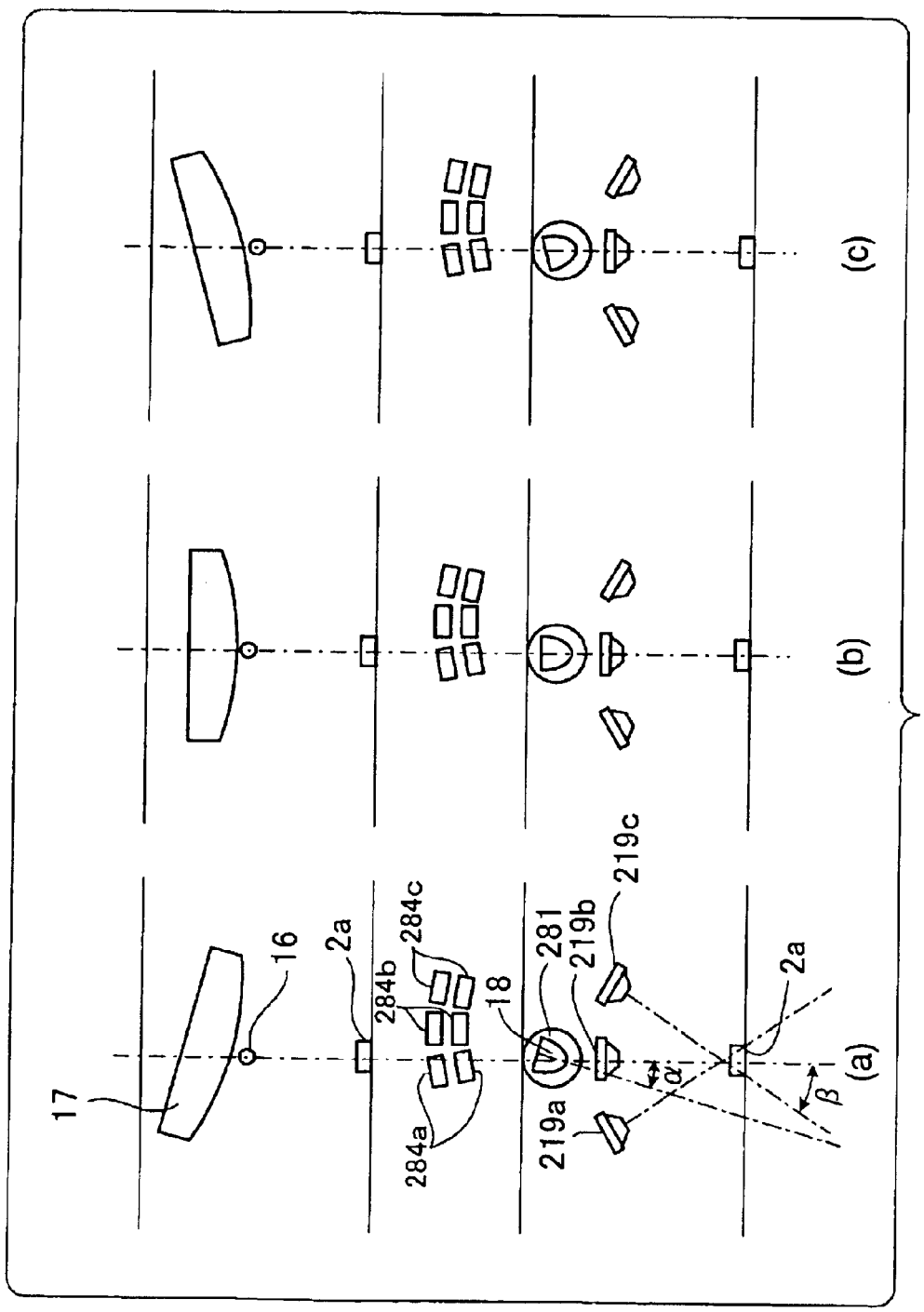
FIG. 15 is a view showing three manners in which the reflecting mirror is used during self-photographing.

FIG. 15 shows three manners in which the reflecting mirror is used during self-photographing.

The upper portions of parts (a) to (c) in FIG. 15 show the direction of the reflecting mirror set when the photographer is positioned in the right, center, and left of the photographing angle of view, respectively. These parts also show the light guide 16 and a viewing window 2a.

The lower portions of parts (a) to (c) in FIG. 15 show sets of terminals 284a, 284b, and 284c; the insertion port 18, into which the insertion bar 17b of the reflecting mirror 17 is inserted and which is provided on the top surface of the camera 2; a cylindrical portion 281 of an embedded member 280 molded of ABS resin so as to form the insertion port 18; and three LEDs 219a, 219b, and 219c. These three LEDs 219a, 219b, and 219c can each emit two types of light in blue and red. The reference characters α and β shown in the figure are as described previously.

Figure 16:
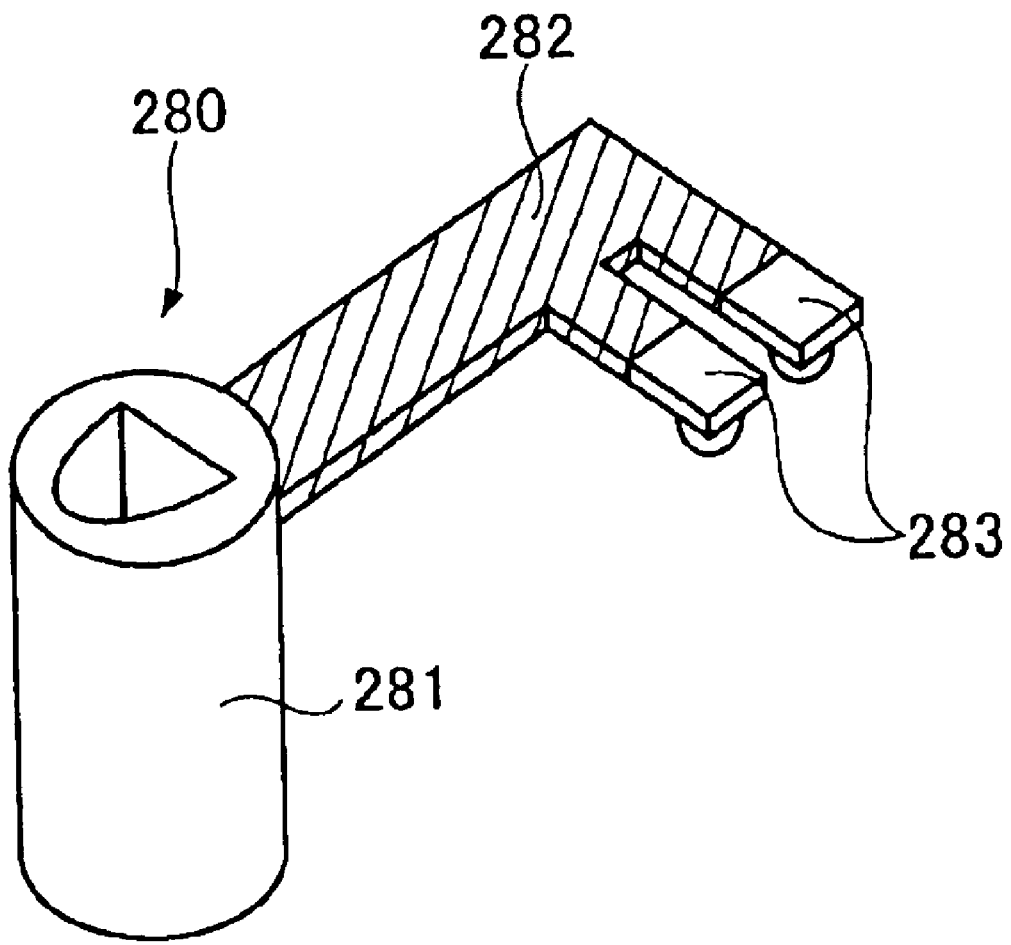
FIG. 16 is a perspective view of the appearance of an embedded member according to this embodiment.

FIG. 16 is a perspective view of the appearance of the embedded member in this embodiment.

FIG. 16 shows the cylindrical portion 281, which forms the insertion port 18, a metal piece 283 fixed to the cylindrical portion, and an insulating material 282 that covers the metal piece except for its tip portion.

As shown in the lower portions of parts (a) to (c) in FIG. 15, when the self-photographer manually sets the reflecting mirror 17 in one of three predetermined directions corresponding to the LED to be viewed by the photographer, the metal piece 283 comes into contact with the corresponding one of the three terminals. First, when the direction of the reflecting mirror 17 is changed leftward relative to the self-photographer to bring the metal piece 283 into contact with the terminal 284c, only the LED 219c emits blue light, whereas the other LEDs emit red light. When the metal piece 283 comes into contact with the terminal 284b, only the LED 219b emits blue light, whereas the other LEDs emit red light. Further, when the metal piece 283 comes into contact with the terminal 284a, only the LED 219a emits blue light, whereas the other LEDs emit red light. That is, with the camera 2, when the self-photographer manually directs the reflecting mirror 17 in a direction corresponding to the LED to be viewed, light from the LED to be viewed appears to have a color different from that of light from the LED that can be observed in the two predetermined directions in which the reflecting mirror 17 does not face. The photographing range coincides with the range of view reflected in the reflecting mirror when the blue light is observed.

Description will be given below of light from the LEDs which can be observed through the viewing windows and the reflecting mirror manually moved so as to correspond to the viewing window used.

Figure 17:
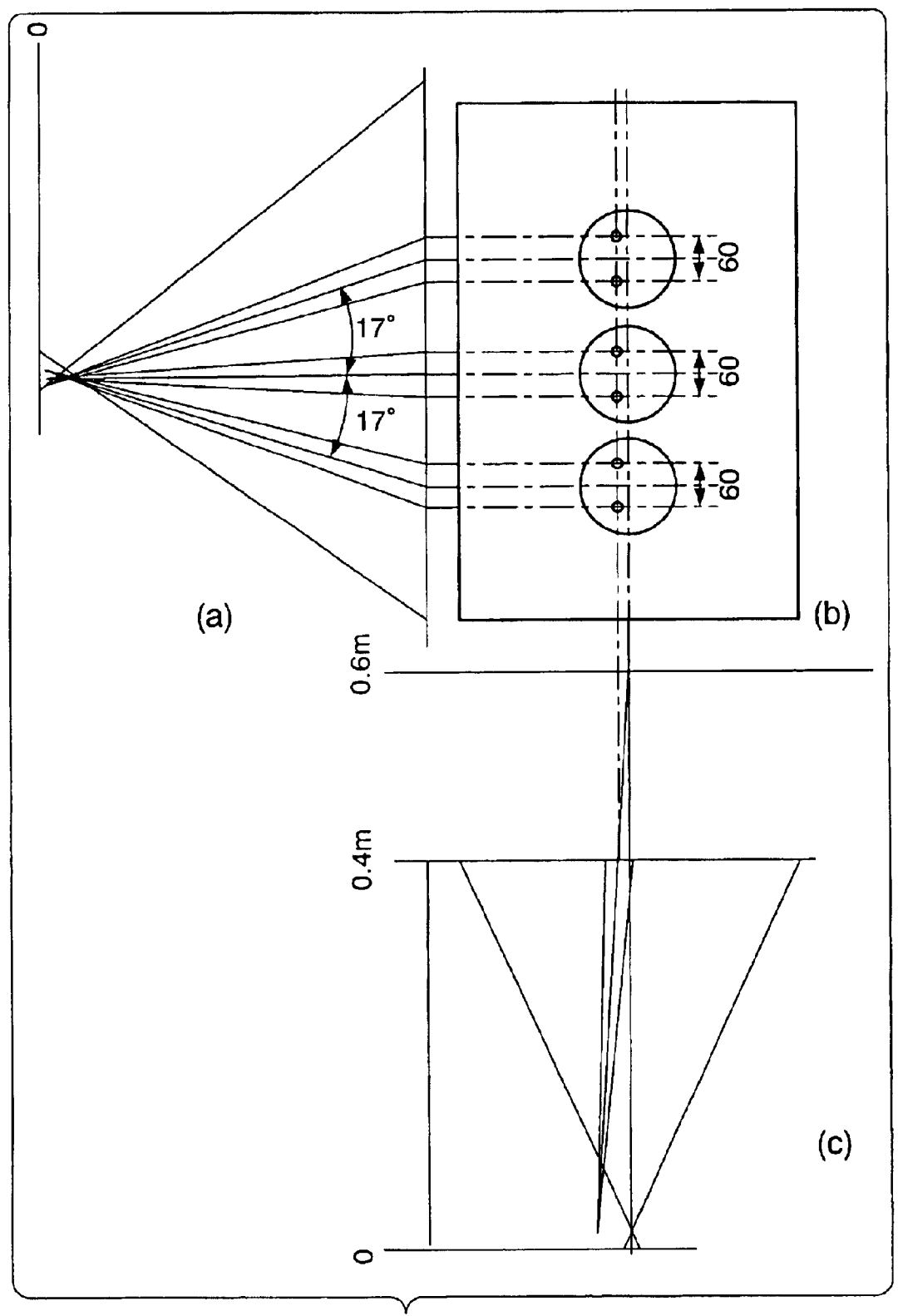
FIG. 17 is a conceptual drawing showing how three people located in front of a film surface in the camera and within a photographing angle of view as subjects observe, with both eyes, light from an LED through the respective three viewing windows.

FIG. 17 is a conceptual drawing showing how three people located in front of the film surface in the camera and within the photographing angle of view as subjects observe, with both eyes, light from the LED through the respective three viewing windows.

Part (a) of FIG. 17 shows how light from the three LEDs 219a, 219b, and 219c travels within the angle of view while being regulated by the viewing window 2a.

In part (b) of FIG. 17, three circles represent three people as subjects located 400 mm before a film surface in the camera. Two smaller circles shown in each of the three circles represent the corresponding person's both eyes. Further, the interval between both eyes of the subject is set at 60 mm. This figure shows how the people observe, with both eyes, light from the LED through the three viewing windows. The camera 2 also uses a photographic film with 24×36 mm frames. During self-photographing, focal distance is fixed at 24 mm, so that the angle of view is 72°. The camera 2 has the three LEDs 219a, 219b, and 219c and the one viewing window 2a arranged therein so that part (b) of FIG. 17 is the same as part (b) of FIG. 5 for the first embodiment. To maintain balance between the three subjects relative to the angle of view of 72°, lights from the adjacent LEDs passing through the center of the viewing window 2a are set to travel within the angle of view while maintaining an angle of 17° in the horizontal direction. Furthermore, to allow people located 400 mm before the film surface and whose interval between both eyes is up to 60 mm to observe light from the LED with both eyes, the viewing windows are regulated in size so that beams from the three LEDs passing through the viewing window 2a travel within the angle of view at an angle of 9° in the horizontal direction.

Description of part (c) in FIG. 17 is the same as that of part (c) in FIG. 5, and is thus omitted.

Figure 18:
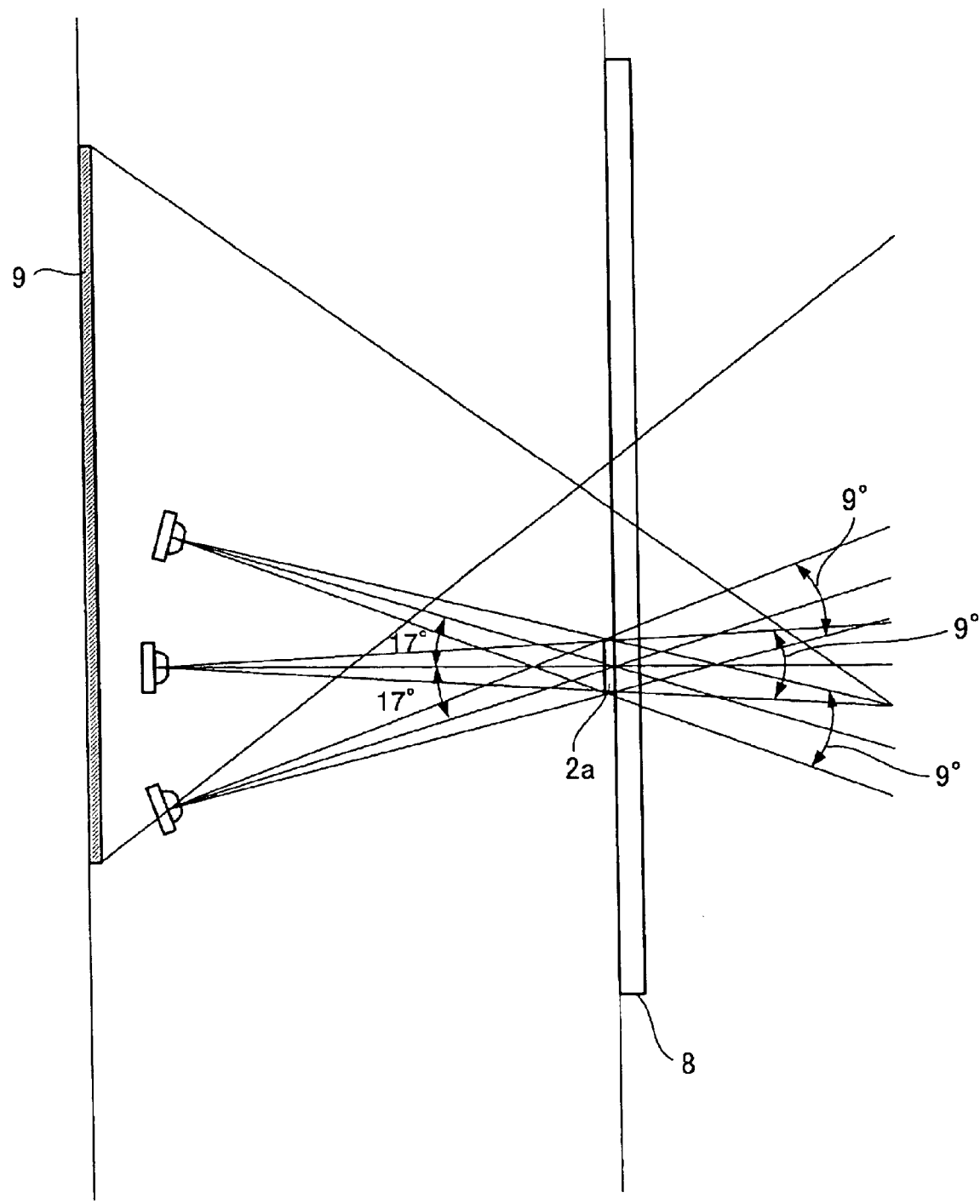
FIG. 18 is a view showing how lights from the three LEDs travel within the angle of view through one viewing window.

FIG. 18 shows how lights from the three LEDs travel within the angle of view through the one viewing window.

FIG. 18 shows a transverse sectional view of the camera 2. This figure shows not only one frame of the roll-like photographic film 9, located at the rear surface of the camera 2; the three LEDs 219a, 219b, and 219c; the viewing window 2a; and the lens barrel 8 but also beams from the LED having a horizontal angle of 9° and regulated by the viewing window so that beams from the adjacent LEDs passing through the center of the viewing window form an angle of 17° and so that people located 400 mm before the film surface and whose interval between both eyes is up to 60 mm can observe the beams with both eyes. The horizontal angle of beams from the LEDs are as described previously and will thus not be described below.

Description of the angle of the reflecting mirror is the same as that given of the camera 1 of the first embodiment with reference to FIG. 8, and is thus omitted.

Also in the camera 2 of this embodiment, when the self-photographing mode is selected, the three LEDs 219a, 219b, and 219c are lighted. This is also carried out by a routine activated simultaneously with the selection of the self-photographing mode. Description of this routine is the same as that given of the camera 100 according to the another aspect of the first embodiment with reference to FIG. 13, and is thus omitted.

Figure 19:
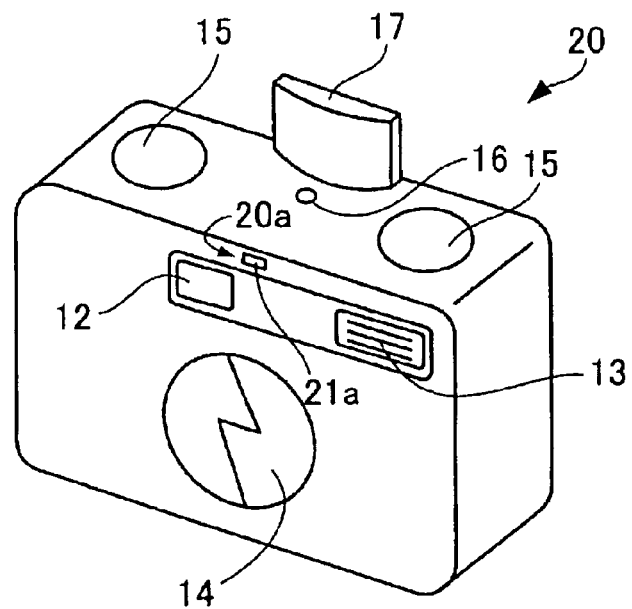
FIG. 19 is a view showing an aspect in which the camera of this embodiment shown in FIG. 14 has its size reduced in the vertical direction.

FIG. 19 shows an aspect in which the camera of this embodiment shown in FIG. 14 has its size reduced in the vertical direction.

A camera 20 according to another aspect of this embodiment shown in FIG. 19 has a viewing window 20a formed closer to the top surface thereof than the viewing window 2a, shown in FIG. 14. The viewing window 20a has a refraction member 21a embedded therein as in the case with the camera 10 according to the another aspect of the first embodiment, shown in FIG. 11. The size reduction of the camera based on the refraction member 21a is as described previously, and description thereof is thus omitted.

Figure 20:
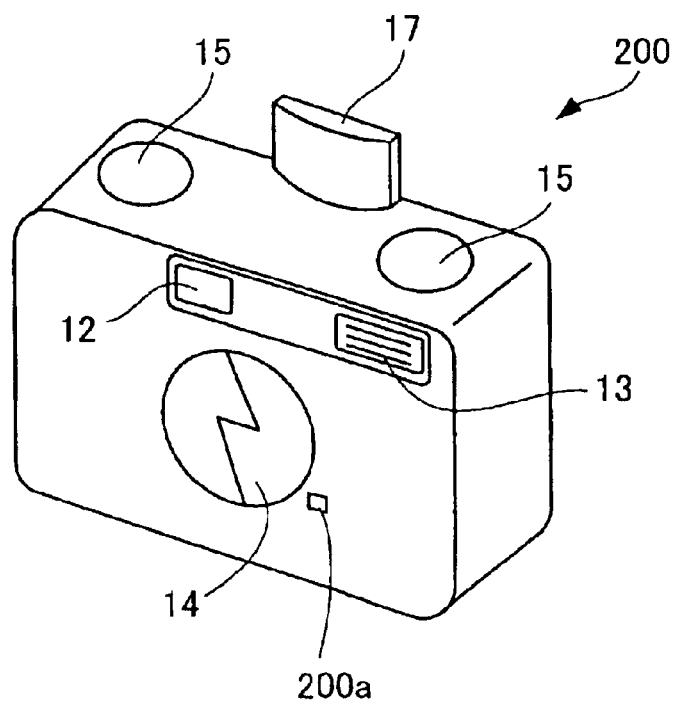
FIG. 20 is a view showing an aspect in which the viewing window and LED provided near the center of top of the camera in FIGS. 14 and 19 are installed near the lower left of a Lens barrel.

FIG. 20 shows an aspect in which the viewing window and LED provided near the center of top of the camera in FIGS. 14 and 19 are installed near the lower left of the Lens barrel.

In a camera 200 according to another aspect of the camera 2 of this embodiment, shown in FIG. 20, a viewing window 200a is shown at the lower left of the lens barrel. Description of this arrangement is the same as that given of the camera 100 according to the another aspect of the camera 1 of the first embodiment, shown in FIG. 12, and is thus omitted.

In the example of the second embodiment of the camera of the present invention, described above, three LEDs are employed. However, the present invention is not limited to this aspect, but one of five LEDs may be viewed through one viewing window, the LED corresponding to a selected one of five predetermined positions within the photographing angle of view.

Furthermore, a third embodiment of the camera of the present invention will be described.

Figure 21:
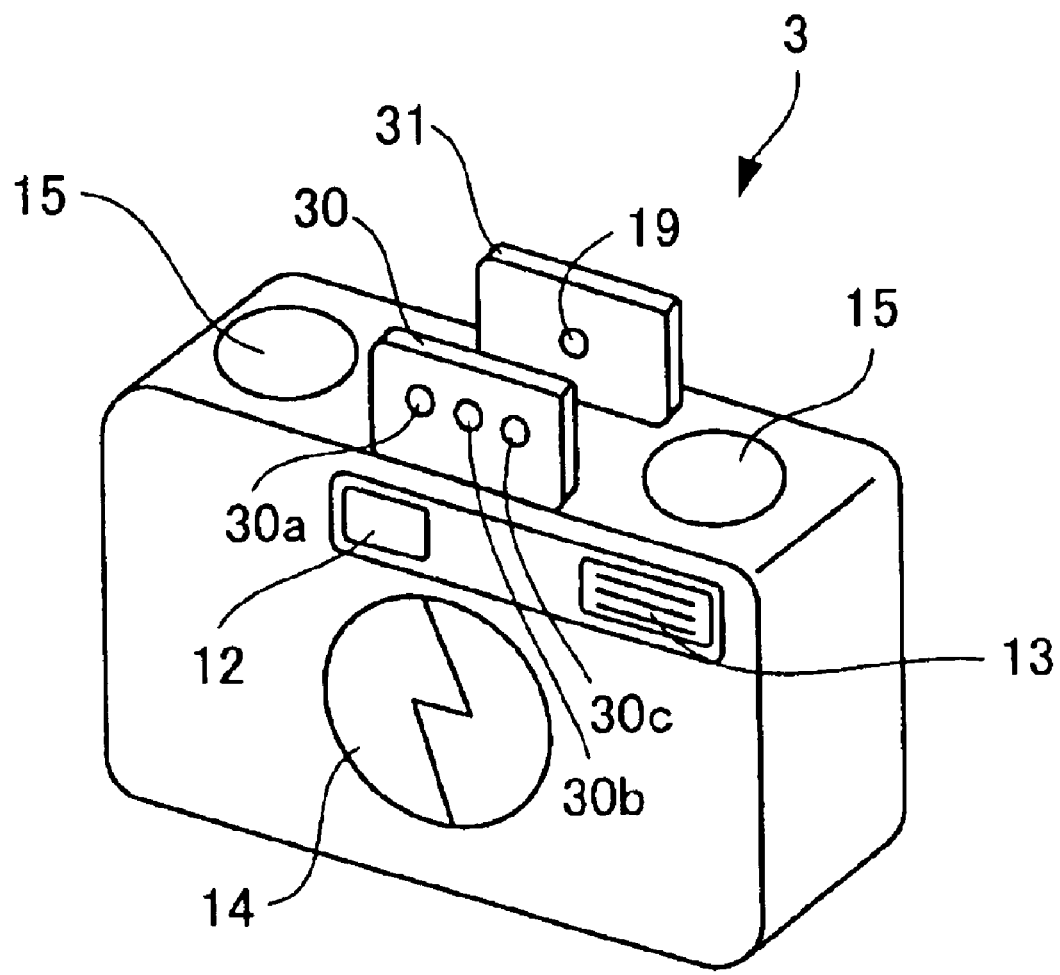
FIG. 21 is a view showing a third embodiment of the camera of the present invention.

FIG. 21 shows the third embodiment of the camera of the present invention.

A camera 3 according to this embodiment, shown in FIG. 21, is a compact camera containing a lens barrel, like the camera 1, shown in FIG. 1. Those components shown in FIG. 21 which are of the same type as the corresponding components shown in FIG. 1 are denoted by the same reference numerals as those in FIG. 1.

Description will be given below of differences in appearance between the camera 3 and the camera 1 of the first embodiment, shown in FIG. 1.

The camera 3 has a first member 30 located at the front surface thereof so as to stand therefrom and a second member 31 located at the rear surface thereof so as to stand therefrom.

The first member 30, shown in FIG. 21, has three small holes 30a, 30b, and 30c formed therein. The second member 31 has the LED 19 provided therein as a light source. In this embodiment, the LED 19 is used as a light source. However, the present invention is not limited to this aspect, but electroluminescence (EL) may be used. Description will be given later of the positional relationship of the first member 30 and second member 31 on the top surface of the camera 3.

Figure 22:
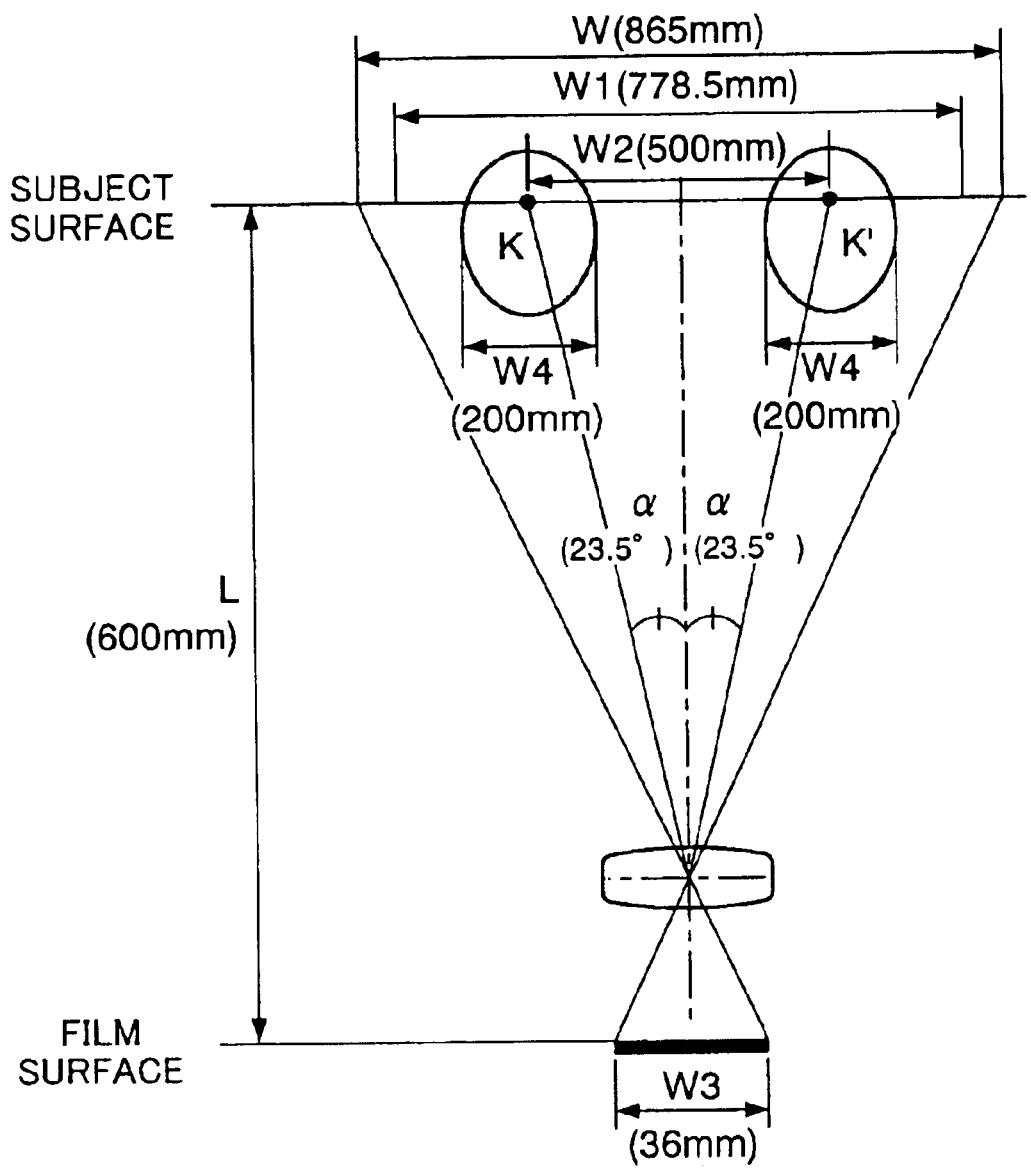
FIG. 22 is a view conceptually showing a cross section taken across a horizontal plane containing the optical axis of a photographing lens in the case where the camera of this embodiment is used to carry out self-photographing.

FIG. 22 conceptually shows a cross section taken across a horizontal plane containing the optical axis of a photographing lens in the case where the camera of this embodiment is used to carry out self-photographing. In this case, it is assumed that two people including the photographer are subjects of self-photographing.

FIG. 22 shows one frame (24×36 mm) of the roll-like film 17 and the heads of two people as subjects. Also in this embodiment, the focal distance is set at 24 mm.

Further, FIG. 22 shows a photographing distance L of 600 mm from a subject surface to the film surface, the range of a horizontal angle of view W (865 mm) on the subject surface, and a horizontal print range W1 (778.5 mm) set if a part of the film cut for printing takes up 10% of the range of angle of view.

Furthermore, FIG. 22 shows the optimum arrangement of the people within the horizontal print range W1 under the assumption that the width of the face of each person as a subject is 200 mm and that the breadth of each person's shoulders is 500 mm with an angle $\alpha$ (23.5°) with respect to the optical axis I. Moreover, W2, shown in FIG. 2, denotes the distance between points K and K' assumed on the two people's heads.

Figure 23:
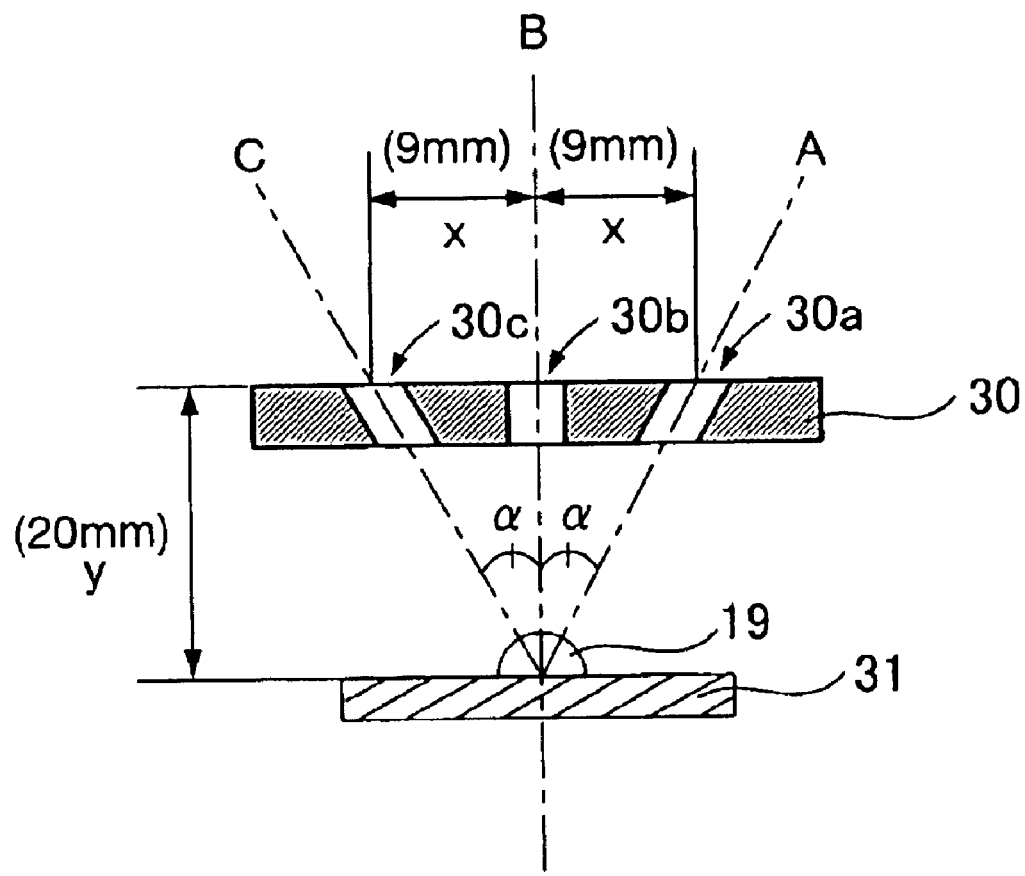
FIG. 23 is a view showing the positional relationship of a first and second members provided on the top surface of the camera shown in FIG. 21 so as to stand therefrom.

FIG. 23 shows the positional relationship of the first and second members, provided on the top surface of the camera shown in FIG. 21 so as to stand therefrom.

FIG. 23 shows a transverse cross section of the first and second members 30 and 31, provided on the top surface of the camera 3 so as to stand therefrom, as viewed from above. The upper part of FIG. 23 corresponds to the front of optical axis of the camera.

A front surface (the top surface in FIG. 3) of the second member 31 is receded a distance y (20 mm) from (in FIG. 3, below) a front surface (the top surface in FIG. 3) of the first member 30 in the direction of the optical axis, shown in FIG. 23.

The LED 19, provided in the second member 31, and the central small hole 30b in the first member 30 are provided vertically above the optical axis I. Further, the left small hole 30c and the right small hole 30a are formed at the opposite sides of the central small hole 30b in the first member 30 with a distance x (9 mm) from the central small hole 30b. The LED 19, central small hole 30b, left small hole 30c, and right small hole 30a are provided at the same height from the optical axis I. The small holes 30a, 30b, and 30c correspond to the viewing windows according to the present invention.

FIG. 23 also shows a line B which extends parallel with the optical axis of the camera and which joins the LED 19 in the second member 31 with the central small hole 30b in the first member 30, a line C which is inclined through the above described angle $\alpha$ (23.5°) from the line B and which extends obliquely leftward in the direction of the optical axis from the LED 19 through the left small hole 30c in the first member 30 to the front (the upper left of FIG. 23) of the camera, and a line A which is inclined through the above described angle $\alpha$ (23.5°) from the line B and which extends obliquely rightward in the direction of the optical axis from the LED 19 through the right small hole 30a in the first member 30 to the front (the upper right of FIG. 23) of the camera. The lines A, B, and C indicate the paths of lights emitted by the LED 19 in the second member 31 and then travelling through the right, central, and left parts of the angle of view, respectively. Thus, light traveling rightward can be viewed at a left position within the print range W1, described previously, at which the optimum balance is found between the subject and the background if the subject is two people. Light traveling leftward can be viewed at a right position within the print range W1, described previously, at which the optimum balance is found between the subject and the background. The distances x and y in FIG. 23 may have such values as meets the relationship $\tan^{-1}(x/y)=23.5°$. In the following description, the lines A, B, and C will be referred to as "optical paths A, B, and C", respectively.

The vertical angle of view on the subject surface (not shown) will be described. Light emitted by the LED 19 in the second member 31, shown in FIG. 21, and then passing through the small holes in the first member 30 travels to slightly above the middle of the print range on the subject surface. Accordingly, if a photograph is taken by viewing the optical paths A, B, and C, each subject's head is located slightly above the middle of the print range and is thus optimum in connection with the balance between the subject and the background. To lower the subject's head, the small holes in the first member 30 may be located lower than the LED 19 in the second member 31.

Figure 24:
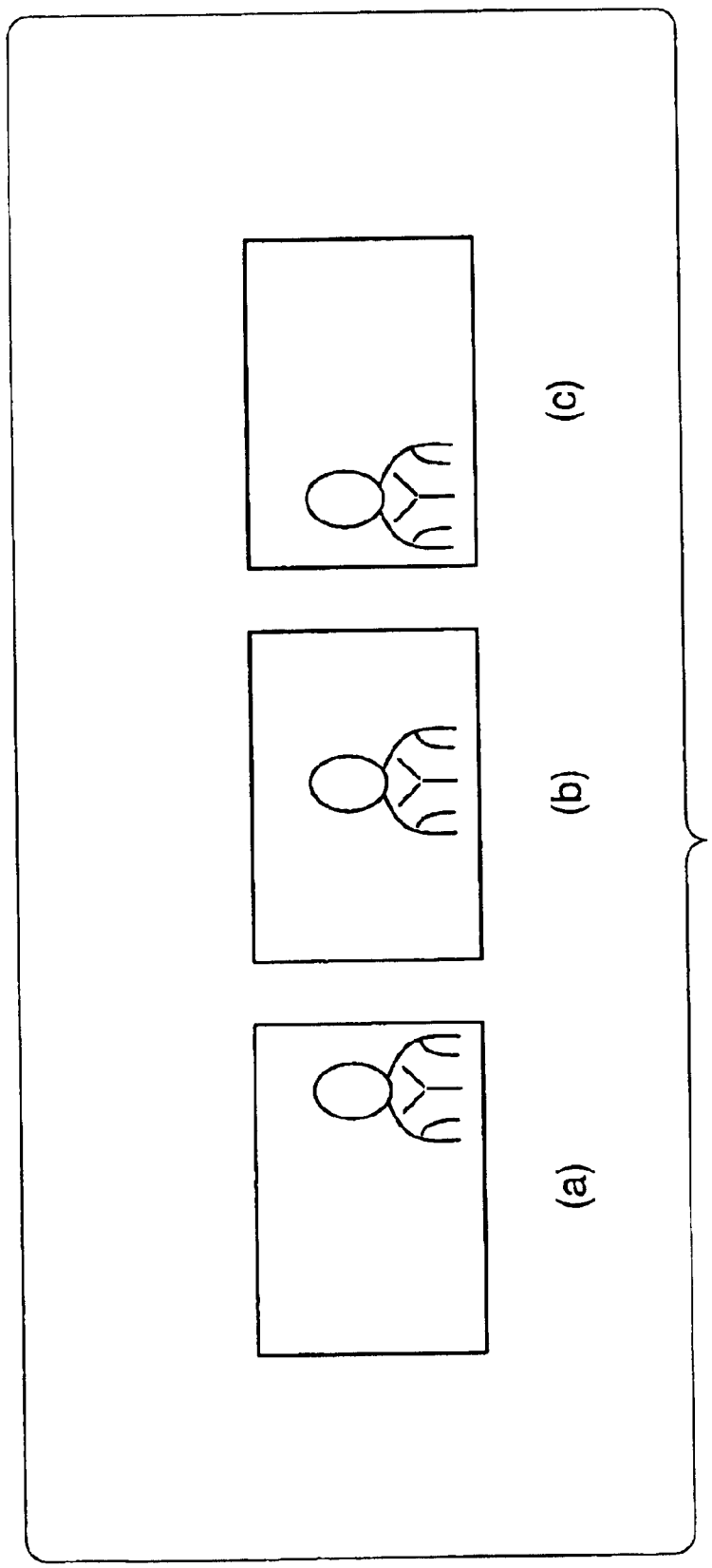
FIG. 24 is a view showing print photographs obtained by a photographing operation by a single photographer by viewing optical paths A, B, and C, respectively, shown in FIG. 23, from the front of the camera.

FIG. 24 shows print photographs obtained by the single photographer by the photographing operation by viewing the optical paths A, B, and C, respectively, shown in FIG. 23, from the front of the camera.

The print photograph shown in part (a) of FIG. 24 shows the self-photographer at the right end thereof, who viewed the optical path A from the front of the camera 3. Further, the print photograph shown in part (b) of FIG. 24 shows the self-photographer in the center thereof, who viewed the optical path B from the front of the camera. The print photograph shown in part (c) of FIG. 24 shows the self-photographer at the left end thereof, who viewed the optical path C from the front of the camera.

Figure 25:
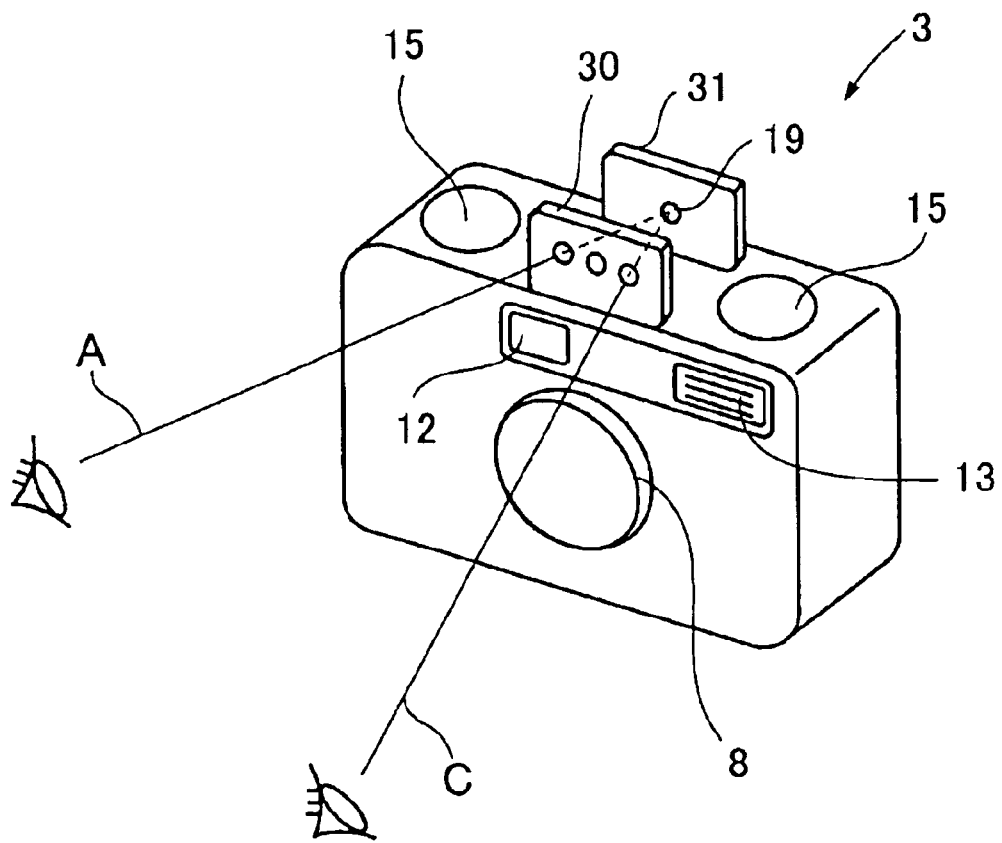
FIG. 25 is a view showing how two people as subjects take a photograph while viewing the optical path A, corresponding to the right of the angle of view, and the optical path C, corresponding to the left of the angle of view, respectively.

FIG. 25 shows how two people as subjects take a photograph while viewing the optical path A, corresponding to the right of the angle of view, and the optical path C, corresponding to the left of the angle of view, respectively. In connection with the shutter button operated during this photographing, a photograph can be smoothly taken by causing, if the person corresponding to the optical path C operates the release button, this person to operate the left release button 15 of the camera 3 with the right hand or causing, if the person corresponding to the optical path A operates the release button 15, this person to operate the right release button 15 of the camera 3 with the left hand.

Figure 26:
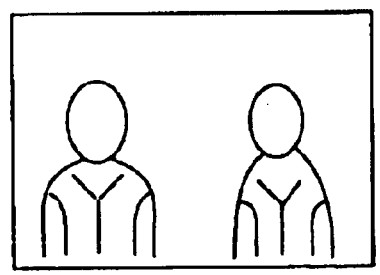
FIG. 26 is a view showing a photograph obtained by the photographing operation shown in FIG. 25.

FIG. 26 shows a photograph obtained by the photographing operation shown in FIG. 25.

FIG. 26 shows the two people viewing the optical paths A and C, respectively, photographed at the right and left ends of a print photograph.

As described above, with the camera 3 of this embodiment, which involves the optical paths A, B, and C, viewing the optical paths A and C allows the subjects to determine that they are located at the optimum positions within the angle of view and within the print range, i.e. at the left and right ends thereof, respectively. Further, viewing the optical path B allows the subject to determine that the subject is located in the center of the print range. Furthermore, the photographer can determine that he or she is between the right end and the center of the print range, when he or she moves to the center of angle of view from the optical path A traveling through the right of the angle of view, and until he or she views the optical path B traveling through the center of the angle of view. On the other hand, the photographer can determine that he or she is between the left end and the center of the print range, when he or she moves to the center of angle of view from the optical path C traveling through the left of the angle of view, and until he or she views the optical path B traveling through the center of the angle of view.

Furthermore, a fourth embodiment of the camera of the present invention will be described.

Figure 27:
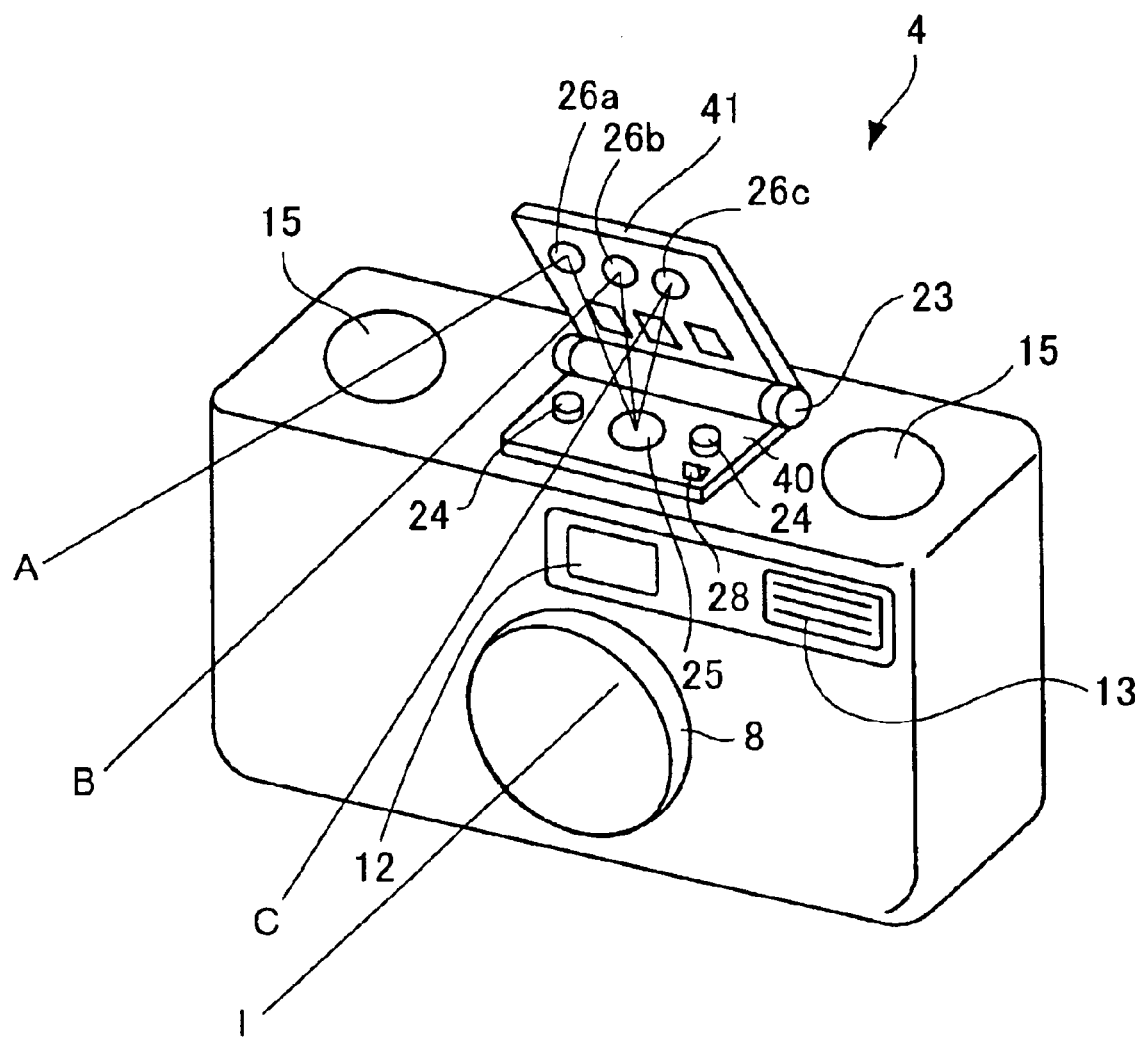
FIG. 27 is a view showing a fourth embodiment of the camera of the present invention.

FIG. 27 shows the fourth embodiment of the camera of the present invention. Those components shown in FIG. 27 which are of the same type as the corresponding components shown in FIG. 1 are denoted by the same reference numerals as those in FIG. 1.

A camera 4, shown in FIG. 27, is constructed by placing a camera cover 44 (see FIG. 29) on a camera main body section 43 (see FIG. 28) and then mounting a base member 40 for self-photographing, described later, on the camera cover section.

The camera 4, shown in FIG. 27, has the base member 40 mounted on the top surface thereof using screws 24. A movable member 41 is rotatably movably attached to a rear end of the base member 40 via a shaft 23. The movable member 41 is brought down toward the front of the camera 4 to come into contact with the base member 40, or the movable member 41, which is in contact with the base member 40, is brought up so as to stand. The base member 40 has a light guide 25 formed near the center thereof to guide light from the LED 19 to above the camera 4, the LED 19 being provided in a camera main body section 43 and described later. Further, the base member 40 has a projection 28 projecting from an end thereof. When the movable member 41 comes into contact with the base member 40 after being brought down toward the front of the camera 4, the projection 28 is pressed by the movable member 41 to turn the switch off, thereby putting out the LED 19, provided in the camera main body section 43. When the movable member 41, which is in contact with the base member 40, is brought up, the switch is turned on to light the LED 19. The movable member 41 has reflecting surfaces 26a, 26b, and 26c provided on a surface thereof which comes into contact with the base member 40, the reflecting surfaces 26a, 26b, and 26c reflecting light from the LED 19 toward the right, center, and left of angle of view. Light guided to above the camera 4 through the light guide 25 is reflected by these reflecting surfaces and travels in the above described three directions within the angle of view. Further, the movable member 41 has framing diagrams provided below the respective three reflecting surfaces and indicating the photographer's own position within the angle of view and within the print range if the photographer views lights reflected by the three reflecting surfaces and then traveling within the angle of view. The reflecting surfaces 26a, 26b, and 26c correspond to the viewing windows according to the present invention.

Figure 28:
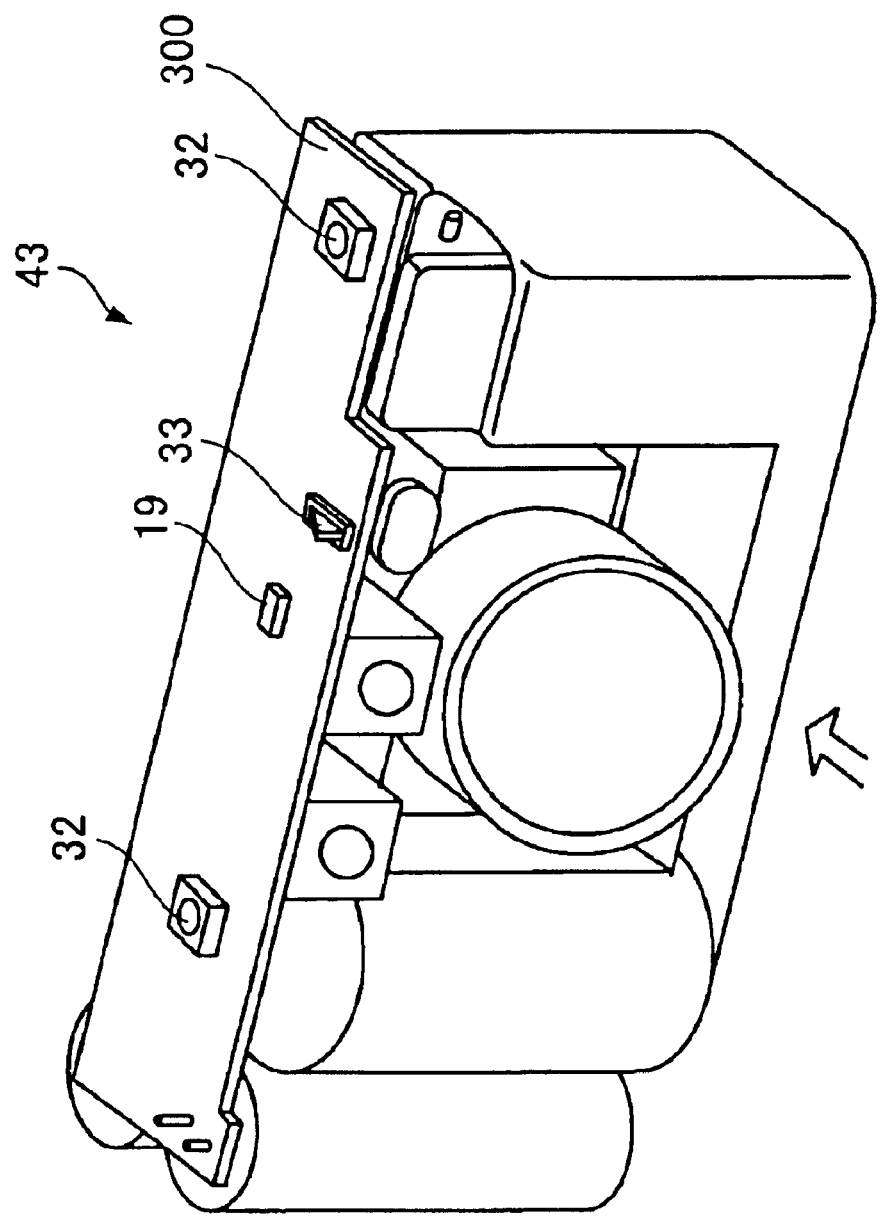
FIG. 28 is a view showing a main body section of the camera of this embodiment.

FIG. 28 shows the main body section of the camera according to this embodiment.

The top surface of the camera main body section 43, shown in FIG. 28, is provided with an electric substrate 300 located below the right and left release buttons 15, shown in FIG. 27, and provided with switches 32 that detect an operation performed on the release buttons, the LED 19, described previously, a switch 33 located below the projection 28, and the like.

Figure 29:
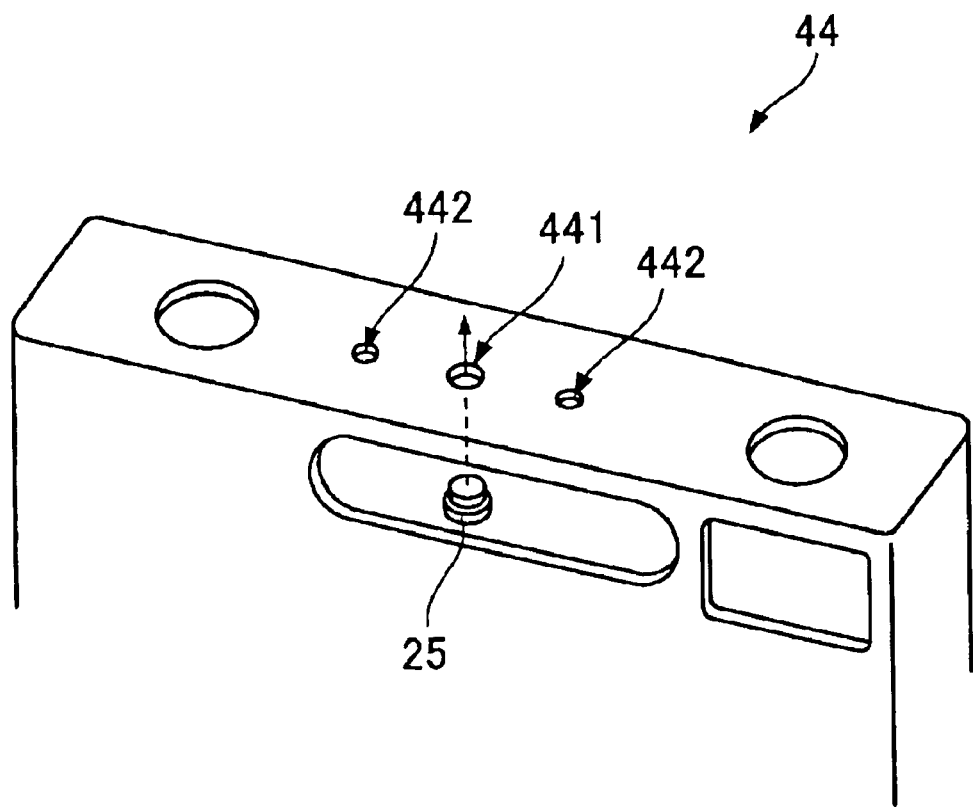
FIG. 29 is a view showing a cover section of the camera of this embodiment.

FIG. 29 shows the cover section of the camera of this embodiment.

FIG. 29 shows a guide hole 441 into which the light guide 25 is fitted, the light guide 25 guiding light emitted by the LED 19 to above the camera 4, the LED 19 being provided in the camera main body section 43. This figure also shows how the light guide 25 is fitted into the guide hole 441 from below.

Further, FIG. 29 also shows two threaded holes 442 in which the respective screws 24, shown in FIG. 27, are screwed. As described previously, the camera cover section 44 with the light guide 25 fitted therein is placed on the camera main body section 43, shown in FIG. 28.

Figure 30:
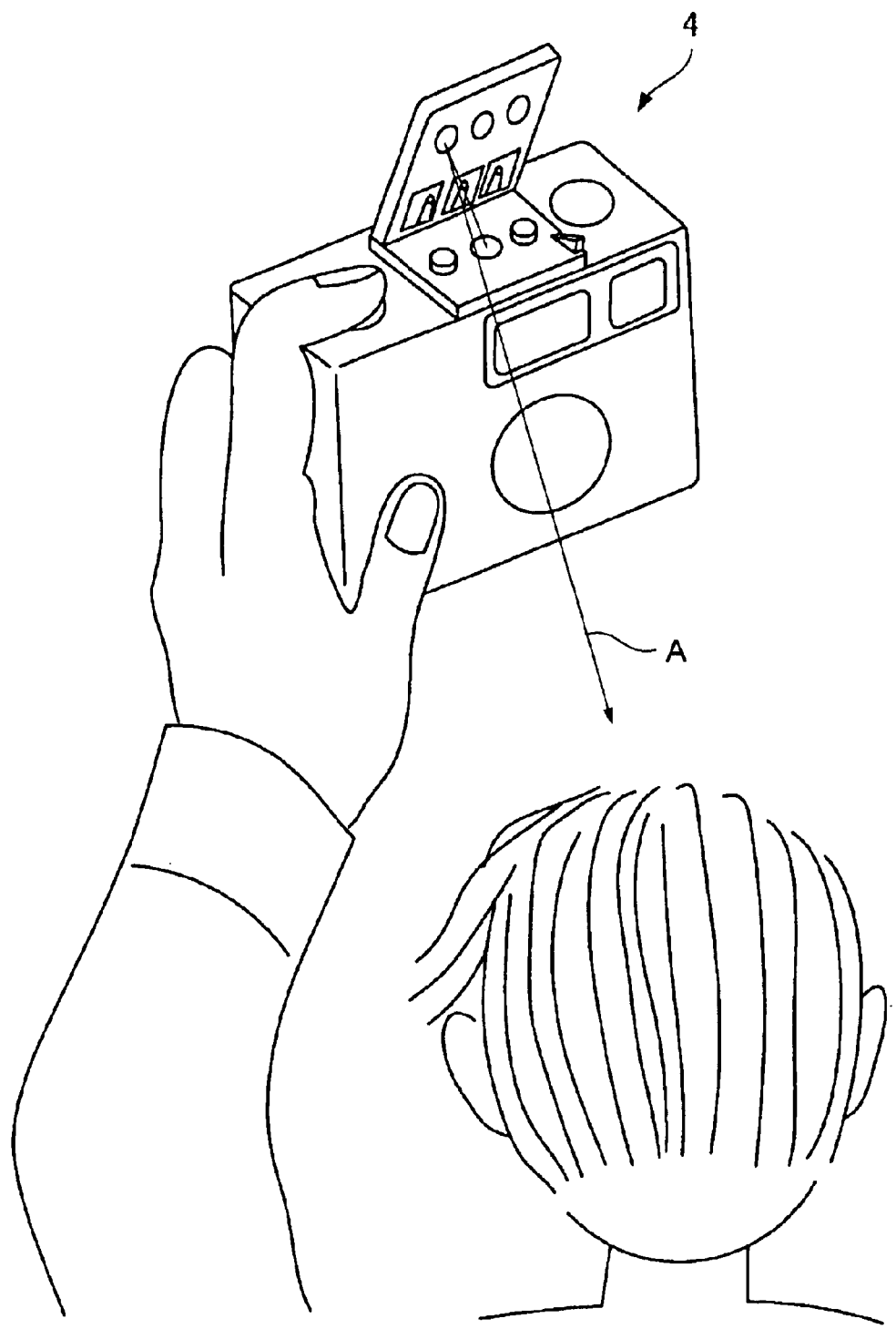
FIG. 30 is a view showing how self-photographing is carried out using the camera of this embodiment.

FIG. 30 shows how self-photographing is carried out using the camera of this embodiment.

FIG. 30 shows a photographer operating the right release button 15 while viewing the optical path A emitted by the LED 19, shown in FIG. 28, reflected by the reflecting surface 26a, and traveling through the right of the angle of view. At this time, the photographer can determine his or her own position within the print photograph using the framing diagram displayed below the reflecting surface 26a, which is viewed by the photographer.

Figure 31:
FIG. 31 shows a photograph obtained by the photographing operation in FIG. 30.

FIG. 31 shows a photograph obtained by the photographing operation in FIG. 30.

FIG. 31 shows the photographer located at the right end of the print photograph as shown by the framing diagram.

According to the camera 4 of the fourth embodiment, described above, viewing light reflected by the reflecting surface 26a or 26c enables the photographer to determine that he or she is at the right or left end of the print range. Further, viewing light reflected by the reflecting surface 26b enables the photographer to determine that he or she is in the center of the print range. Furthermore, the photographer can determine that he or she is between the right end and the center of the print range, when he or she moves to the center of angle of view from the optical path A reflected by the reflecting mirror 26a and then traveling through the right of the angle of view, and until he or she views the optical path B reflected by the reflecting mirror 26b and then traveling through the center of the angle of view. On the other hand, the photographer can determine that he or she is between the left end and the center of the print range, when he or she moves to the center of angle of view from the optical path C reflected by the reflecting mirror 26c and then traveling through the left of the angle of view, and until he or she views the optical path B reflected by the reflecting mirror 26b and then traveling through the center of the angle of view.

Finally, a fifth embodiment of the camera of the present invention will be described.

Figure 32:
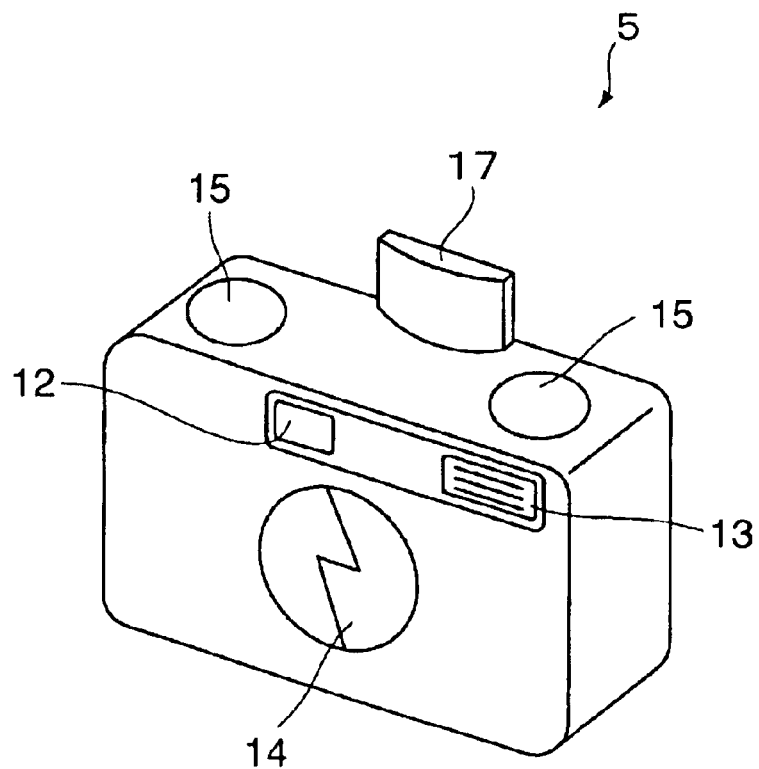
FIG. 32 is a perspective view of the appearance of the camera of this embodiment as viewed diagonally from the front thereof.

FIG. 32 is a perspective view of the appearance of the camera of this embodiment as viewed diagonally from the front thereof.

A camera 5 of this embodiment in FIG. 32 is of the same type as the camera 1 of the first embodiment, shown in FIG. 1, and contains a lens barrel.

The camera 5 of this embodiment, shown in FIG. 32, has the same appearance as the camera 100, shown in FIG. 12, except that the camera 5 is free of the viewing windows 10a, 10b, and 100c. Those components externally provided on the camera 5 which are of the same type as those shown in FIG. 12 are denoted by the same reference numerals as those in FIG. 12. All components shown in FIG. 32 have already been described.

Figure 33:
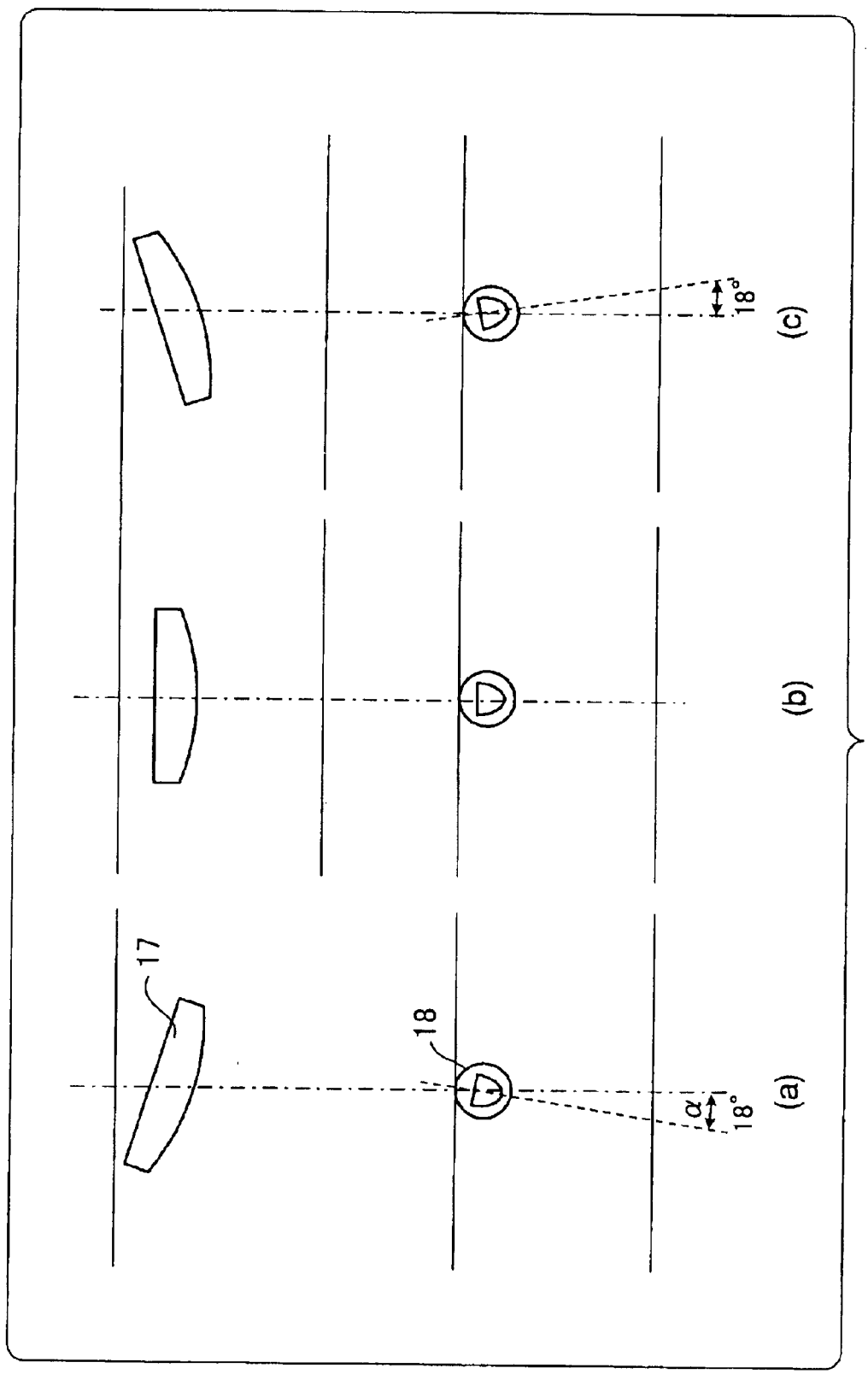
FIG. 33 is a view showing three manners in which the reflecting mirror is used during self-photographing.

FIG. 33 shows three manners in which the reflecting mirror is used during self-photographing.

The upper portions of parts (a) to (c) in FIG. 33 show the direction of the reflecting mirror set when the photographer is positioned at the right end, in the center, and at the left end of the photographing angle of view, respectively.

The lower portions of parts (a) to (c) in FIG. 33 show the insertion port 18, which is formed in the top surface of the camera 5 and into which the insertion bar 17b of the reflecting mirror 17 is inserted. In this case, the angle (a horizontal component) between the optical axis of the camera and the central axis of the reflecting mirror 17 is set at 18°. The reflecting mirror is held so as to face exactly frontward or in a direction inclined rightward or leftward from the front through 18°. The angle of 18° is calculated on the basis of the fact that the camera 5 has a photographing angle of view of 72° during self-photographing. If the reflecting mirror 17 is inclined leftward through 18° relative to the self-photographer, the right end of the photographing angle of view corresponds to the left end of the reflecting mirror 17, at which the self-photographer views himself or herself reflected in the reflecting mirror. Further, if the reflecting mirror 17 is inclined rightward through 18° relative to the self-photographer, the left end of the photographing angle of view corresponds to the right end of the reflecting mirror 17, at which the self-photographer views himself or herself reflected in the reflecting mirror. Furthermore, if the reflecting mirror 17 is directed to the exact front of the camera, the center of the photographing angle of view corresponds to the center of the reflecting mirror 17, at which the self-photographer views himself or herself reflected in the reflecting mirror.

Figure 34:
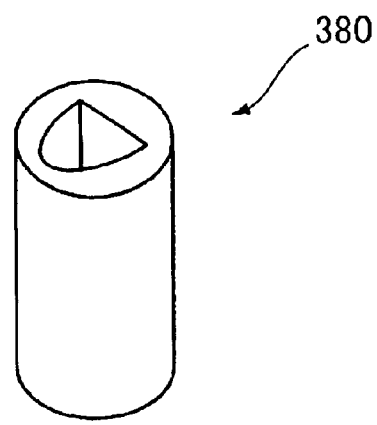
FIG. 34 is a perspective view of the appearance of an embedded member.

FIG. 34 is a perspective view of the appearance of an embedded member.

FIG. 34 shows an embedded member 380 forming the insertion port 18.

Figure 35:
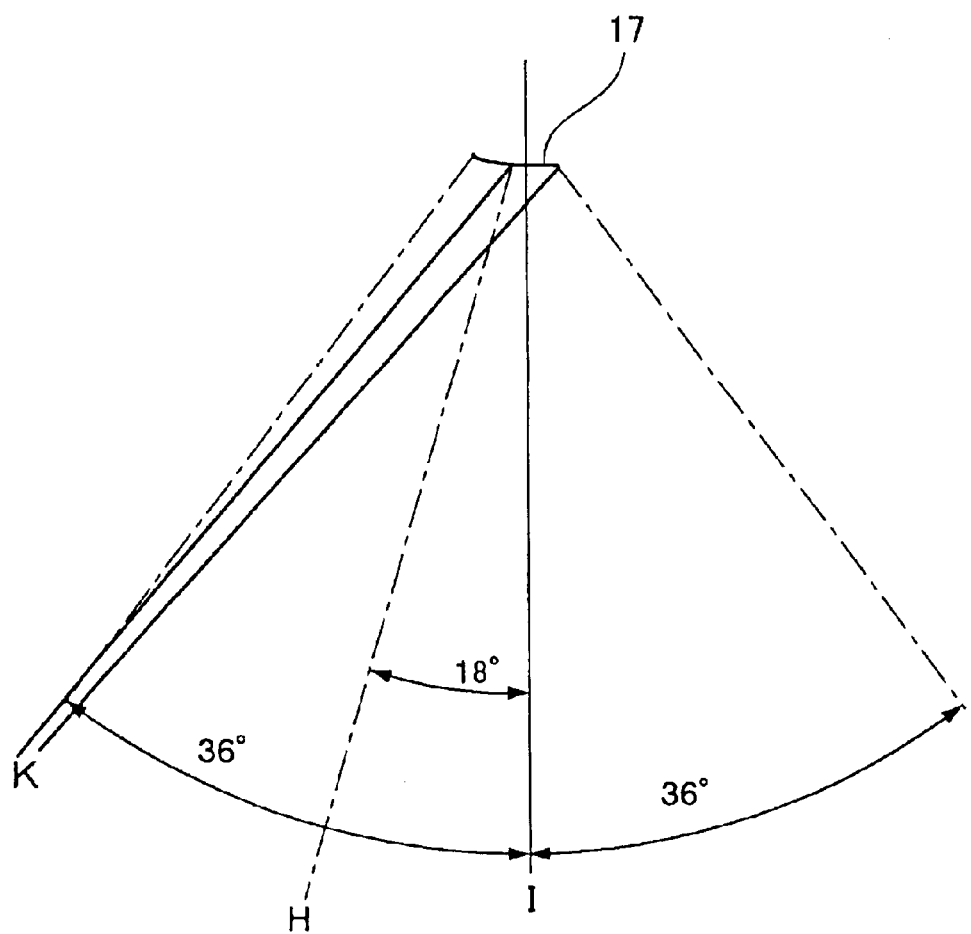
FIG. 35 is a view illustrating the angle of the reflecting mirror.

FIG. 35 illustrates the angle of the reflecting mirror.

FIG. 35 shows the reflecting mirror directed rightward and also shows the angle of view of 72°, the optical axis I of the camera, the normal H of the reflecting mirror, and a line K indicative of the self-photographer's position. The angle between the optical axis I of the camera and the normal H of the reflecting mirror is set at 18°. Accordingly, if the self-photographer views the reflecting mirror, the right end of the photographing angle of view corresponds to the left end of the reflecting mirror, at which the self-photographer views himself or herself reflected in the reflecting mirror.

According to the camera 5 of the fifth embodiment, described above, the reflecting mirror can be held so as to face the right, left, or center of the photographing angle of view. If the reflecting mirror is directed to a predetermined left position as viewed from the self-photographer, the self-photographer can determine whether or not he or she is within the angle of view depending on whether or not the self-photographer views himself or herself reflected at the left end of the reflecting mirror. Further, if the reflecting mirror is directed to a predetermined right position as viewed from the self-photographer, the self-photographer can determine whether or not he or she is within the angle of view depending on whether or not the self-photographer views himself or herself reflected at the right end of the reflecting mirror. Furthermore, if the reflecting mirror is directed to a predetermined front position, the self-photographer can determine that he or she is in the center of the photographing angle of view by reflecting himself or herself in the center of the reflecting mirror.

The first, third, and fourth embodiments of the camera of the present invention comprise the three independent viewing windows, small holes, or reflecting surfaces in order to regulate light from the light source so that it travels through the left, center, and right of angle of view. However, the present invention is not limited to these aspects. The three independent viewing windows or small holes may be replaced with one long hole covering the area from left to right small holes. Alternatively, the three independent reflecting surfaces may be replaced with one elongate reflecting surface covering the area from left to right reflecting surfaces.

Figure 36:
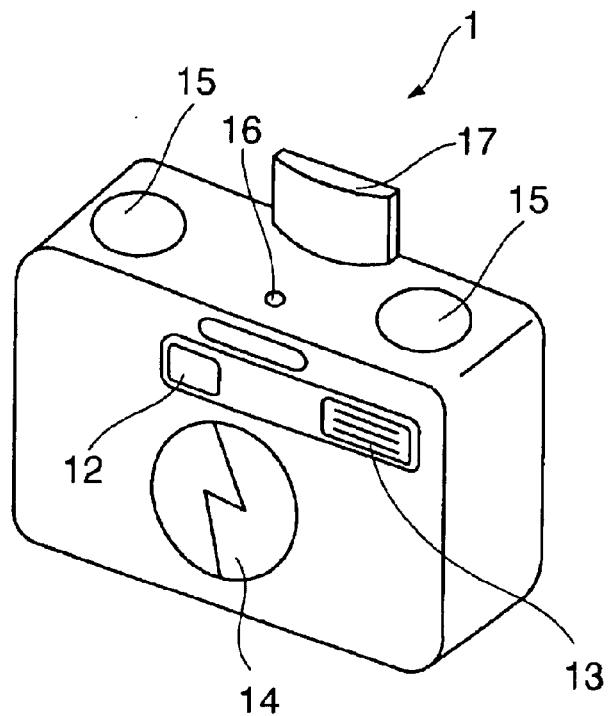
FIG. 36 is a view showing the case in which a long hole replaces the viewing windows formed in the first embodiment of the camera of the present invention.

FIG. 36 shows the case in which a long hole replaces the viewing windows formed in the first embodiment of the camera of the present invention.

Figure 37:
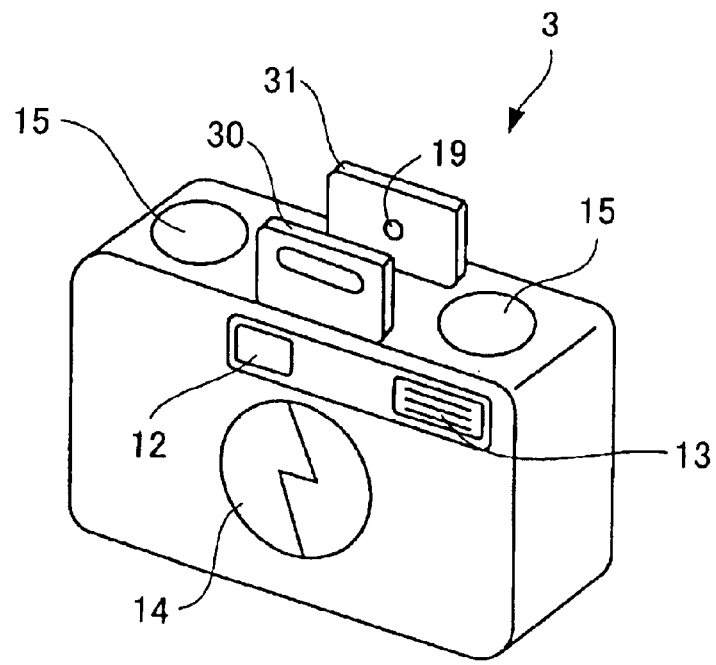
FIG. 37 is a view showing the case in which a long hole replaces the small holes formed in the third embodiment of the camera of the present invention.

FIG. 37 shows the case in which a long hole replaces the small holes formed in the third embodiment of the camera of the present invention.

Figure 38:
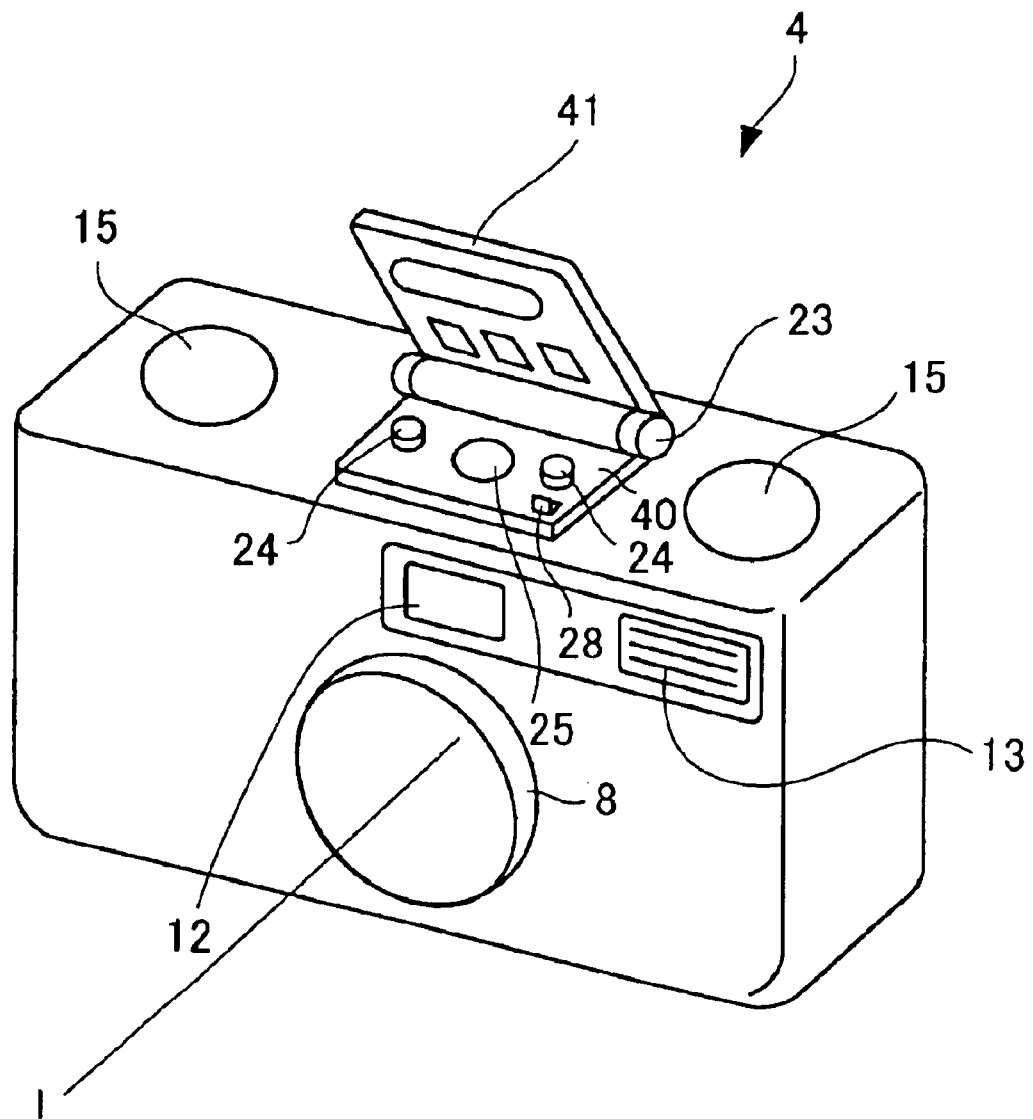
FIG. 38 is a view showing the case in which a prolate ellipsoidal reflecting surface replaces the reflecting surfaces provided in the fourth embodiment of the camera of the present invention.

FIG. 38 shows the case in which a prolate ellipsoidal reflecting surface replaces the reflecting surfaces provided in the fourth embodiment of the camera of the present invention.

Even in these cases, the photographer can accurately determine his or her own position within the angle of view by checking through which part of the long hole or elongate reflecting surface light travels.

Further, in the description of the third and fourth embodiments, the optical path regulating member according to the present invention is provided on the top surface of the camera. However, the present invention is not limited to this aspect. The optical path regulating member may be contained in the camera so as to provide similar functions.

Furthermore, in the description of the first to fifth embodiments, the roll-like film (24×36 mm) is loaded in the camera. However, the present invention is not limited to this aspect, but an instant or electronic camera may be used. Alternatively, the camera may have a self-photographing lens installed at the tip of a photographing lens. Further, in the first to fifth embodiments, the camera is provided with the shutter buttons at the respective opposite ends thereof. However, the present invention is not affected even if the camera is provided with only one shutter button at either end thereof.

Furthermore, in the description of the first to fourth embodiments, the LED is used as an indicator according to the present invention. However, the indicator according to the present invention is not limited to the LED. The effects of the present invention are not affected even if a through-hole, a seal or other viewable component is used.

What is claimed is:

1. A camera that photographs a subject present within a photographing angle of view, according to a photographing operation, the camera comprising:

an indicator; and an optical path regulating member that allows, during self-photographing, a photographer to view said indicator with information on the photographer's own position relative to a plurality of predetermined positions within the photographing angle of view, wherein the indicator comprises a plurality of Light Emitting Diodes.

2. The camera according to claim 1, further comprising shutter buttons for a photographing operation arranged at respective opposite ends of a top surface of the camera.

3. The camera according to claim 2, wherein either of the shutter buttons may be pressed to perform the photographing operation.

4. A camera that photographs a subject present within a photographing angle of view, according to a photographing operation, the camera comprising:

an indicator; and an optical path regulating member that allows, during self-photographing, a photographer to view said indicator with information on the photographer's own position within the photographing angle of view, wherein said optical path regulating member has three viewing windows that allow, during self-photographing, the photographer to view said indicator only when the photographer views the indicator from either a central direction or a predetermined right-hand direction or a predetermined left-hand direction within the photographing angle of view.

5. The camera according to claim 4, further comprising shutter buttons for a photographing operation arranged at respective opposite ends of a top surface of the camera.

6. The camera according to claim 5, wherein either of the shutter buttons may be pressed to perform the photographing operation.

7. A camera that photographs a subject present within a photographing angle of view, according to a photographing operation, the camera comprising:

an indicator; and an optical path regulating member that allows, during self-photographing, a photographer to view said indicator with information on the photographer's own position within the photographing angle of view, wherein said optical path regulating member has a plurality of viewing windows that allow, during self-photographing, the photographer to view said indicator only when the photographer views the indicator from one of a plurality of predetermined directions within the photographing angle of view.

8. The camera according to claim 7, further comprising shutter buttons for a photographing operation arranged at respective opposite ends of a top surface of the camera.

9. The camera according to claim 8, wherein either of the shutter buttons may be pressed to perform the photographing operation.

10. The camera according to claim 7, wherein said viewing window is sized to allow the photographer to view said indicator with both eyes when the photographer views the indicator from one of said plurality of predetermined directions.

11. The camera according to claim 7, wherein said viewing window comprises a refraction member that refracts beams traveling from said indicator toward said viewing window, toward an optical axis of a photographing lens.

12. The camera according to claim 11, wherein said refraction member is also used as a cover member that covers said viewing window.

13. The camera according to claim 11, wherein said refraction member is shaped like a wedge.

14. The camera according to claim 7, wherein said viewing window is disposed adjacent to a photographing lens barrel.

15. The camera according to claim 7, comprising a reflecting mirror that allows the photographer to determine that the subject is within the photographing angle of view during self-photographing, the reflecting mirror being able to be set, during self-photographing, to face in a direction in which the photographer can determine that the photographer is within the photographing angle of view irrespective of whichever of said plurality of directions the photographer views the indicator from.

16. The camera according to claim 15, comprising color changing means for changing only one of the different colors of the indicator perceived when said indicator is viewed from each of said plurality of predetermined directions, the color corresponding to the direction of said reflecting mirror.

17. A camera as recited in claim 15, wherein the reflecting mirror rotates about an axis substantially orthogonal to a surface of the camera whereupon the reflecting mirror is mounted.

18. A camera as recited in claim 15, wherein the photographer can make the determination that the subject is within the photographing angle of view when the reflecting mirror is facing any of the plurality of directions.

19. A camera as recited in claim 15, wherein:
the reflecting mirror comprises an upper mirror section of a generally rectangular shape, and a lower insertion bar of a generally cylindrical shape that extends from the upper mirror section;
the lower insertion bar protrudes into an insertion port of the camera;
and the reflecting mirror rotates about an axis formed by the interface of the lower insertion bar and the insertion port.

20. The camera according to claim 7, wherein said indicator is a light emitting element comprising an alarm display section that guides light from the light emitting element to notify the photographer of a self-photographing mode.

21. The camera according to claim 7, wherein said indicator is a light emitting element which is lighted in response to switching to the self-photographing mode, starts blinking after a predetermined time, and is subsequently put out.

22. A camera that photographs a subject present within a photographing angle of view, according to a photographing operation, the camera comprising:
an indicator;
an optical path regulating member that allows, during self-photographing, a photographer to view said indicator with information on the photographer's own position within the photographing angle of view; and
a plurality of said indicators, wherein
said optical path regulating member has a viewing window that allows, during self-photographing, the photographer to view one of said plurality of indicators when the photographer views the indicator from one of a plurality of predetermined directions within the photographing angle of view.

23. The camera according to claim 22, further comprising shutter buttons for a photographing operation arranged at respective opposite ends of a top surface of the camera.

24. The camera according to claim 23, wherein either of the shutter buttons may be pressed to perform the photographing operation.

25. The camera according to claim 22, wherein said viewing window is sized to allow the photographer to view said indicator with both eyes when the photographer views the indicator from one of said plurality of predetermined directions.

26. The camera according to claims 22, wherein said viewing window comprises a refraction member that refracts beams traveling from said indicator toward said viewing window, toward an optical axis of a photographing lens.

27. The camera according to claim 26, wherein said refraction member is also used as a cover member that covers said viewing window.

28. The camera according to claim 26, wherein said refraction member is shaped like a wedge.

29. The camera according to claim 22, wherein said viewing window is disposed adjacent to a photographing lens barrel.

30. The camera according to claim 22, comprising a reflecting mirror that allows the photographer to determine that the subject is within the photographing angle of view during self-photographing, the reflecting mirror being able to be set, during self-photographing, to face in a direction in which the photographer can determine that the photographer is within the photographing angle of view irrespective of whichever of said plurality of directions the photographer views the indicator from.

31. The camera according to claim 30, comprising color changing means for changing only one of the different colors of the indicator perceived when said indicator is viewed from each of said plurality of predetermined directions, the color corresponding to the direction of said reflecting mirror.

32. A camera as recited in claim 30, wherein the reflecting mirror rotates about an axis substantially orthogonal to a surface of the camera whereupon the reflecting mirror is mounted.

33. A camera as recited in claim 30, wherein the photographer can make the determination that the subject is within the photographing angle of view when the reflecting mirror is facing any of the plurality of directions.

34. A camera as recited in claim 30, wherein:
reflecting mirror comprises an upper mirror section of a generally rectangular shape, and a lower insertion bar of a generally cylindrical shape that extends from the upper mirror section;
the lower insertion bar protrudes into an insertion port of the camera;
and the reflecting mirror rotates about an axis formed by the interface of the lower insertion bar and the insertion port.

35. The camera according to claim 22, wherein said indicator is a light emitting element comprising an alarm display section that guides light from the light emitting element to notify the photographer of a self-photographing mode.

36. The camera according to 22, wherein said indicator is a light emitting element which is lighted in response to switching to the self-photographing mode, starts blinking after a predetermined time, and is subsequently put out.

37. A camera that photographs a subject present within a photographing angle of view, according to a photographing operation, the camera comprising:
a reflecting mirror that allows a photographer to determine that the subject is within the photographing angle of view during self-photographing, the reflecting mirror being able to be set to face in any of a plurality of directions and to remain facing in this direction,
wherein the reflecting mirror rotates about an axis substantially orthogonal to a surface of the camera whereupon the reflecting mirror is mounted.

38. A camera that photographs a subject present within a photographing angle of view, according to a photographing operation, the camera comprising:
a reflecting mirror that allows a photographer to determine that the subject is within the photographing angle of view during self-photographing, the reflecting mirror being able to be set to face in any of a plurality of directions and to remain facing in this direction,
wherein the photographer can make the determination that the subject is within the photographing angle of view when the reflecting mirror is facing any of the plurality of directions.

39. A camera that photographs a subject present within a photographing angle of view, according to a photographing operation, the camera comprising:

a reflecting mirror that allows a photographer to determine that the subject is within the photographing angle of view during self-photographing, the reflecting mirror being able to be set to face in any of a plurality of directions and to remain facing in this direction, wherein:

the reflecting mirror comprises an upper mirror section of a generally rectangular shape, and a lower insertion bar of a generally cylindrical shape that extends from the upper mirror section;

the lower insertion bar protrudes into an insertion port of the camera;

and the reflecting mirror rotates about an axis formed by the interface of the lower insertion bar and the insertion port.

40. A camera that photographs a subject present within a photographing angle of view, according to a photographing operation, the camera comprising:

an indicator;

an optical path regulating member that allows, during self-photographing, a photographer to view said indicator with information on the photographer's own position relative to a plurality of predetermined positions within the photographing angle of view; and a reflecting mirror with a reflective surface arranged in a similar direction to the indicator.

* * * * *